United States Patent
Zhang et al.

(10) Patent No.: US 12,445,551 B2
(45) Date of Patent: Oct. 14, 2025

(54) NOTIFICATION PROMPT METHOD, SERVER, AND STORAGE MEDIUM

(71) Applicant: Huawei Technologies Co., Ltd., Shenzhen (CN)

(72) Inventors: Yanan Zhang, Shenzhen (CN); Shi Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 156 days.

(21) Appl. No.: 17/820,644

(22) Filed: Aug. 18, 2022

(65) Prior Publication Data
US 2022/0398334 A1 Dec. 15, 2022

Related U.S. Application Data

(63) Continuation of application No. PCT/CN2020/125614, filed on Oct. 31, 2020.

(30) Foreign Application Priority Data

Feb. 19, 2020 (CN) .......................... 202010102629.2

(51) Int. Cl.
*H04L 9/40* (2022.01)
*G06F 21/62* (2013.01)
(Continued)

(52) U.S. Cl.
CPC .... *H04M 1/724631* (2022.02); *G06F 21/629* (2013.01); *H04L 9/40* (2022.05);
(Continued)

(58) Field of Classification Search
CPC ........... G06F 21/629; G06F 2221/2139; H04L 51/043; H04L 51/21; H04L 2209/42;
(Continued)

(56) References Cited

U.S. PATENT DOCUMENTS

| | | | |
|---|---|---|---|
| 10,097,499 B1 | 10/2018 | Kumar et al. | |
| 2016/0179359 A1* | 6/2016 | Kodejs | G06F 3/0481 715/763 |

(Continued)

FOREIGN PATENT DOCUMENTS

| | | | |
|---|---|---|---|
| CN | 104519037 A | 4/2015 | |
| CN | 104992096 A | 10/2015 | |

(Continued)

*Primary Examiner* — Farid Homayounmehr
*Assistant Examiner* — Judy Bazna
(74) *Attorney, Agent, or Firm* — Slater Matsil, LLP

(57) ABSTRACT

This application provides a notification prompt method, a server, and a storage medium. The method includes: when a notification is received, determining a target terminal that meets a preset notification prompt condition from terminal devices on which an account of a target user is logged in; obtaining identity information of a user currently using the target terminal; and when detecting, based on the identity information, that only the target user is currently using the target terminal, controlling the target terminal to prompt the notification in a first prompt mode, where preview content of the notification is displayed in the first prompt mode; or when detecting, based on the identity information, that a plurality of users are currently using the target terminal, controlling the target terminal to prompt the notification in a second prompt mode, where preview content of the notification is not displayed in the second prompt mode.

18 Claims, 24 Drawing Sheets

(51) Int. Cl.
*H04L 51/043* (2022.01)
*H04L 51/21* (2022.01)
*H04M 1/72463* (2021.01)

(52) U.S. Cl.
CPC ............ *H04L 51/043* (2013.01); *H04L 51/21* (2022.05); *G06F 2221/2139* (2013.01)

(58) Field of Classification Search
CPC ....... H04L 9/40; H04L 63/0407; H04L 63/08; H04L 63/0861; H04W 12/33; H04W 12/02; H04W 12/65; H04W 12/72; H04M 1/724631
See application file for complete search history.

(56) References Cited

U.S. PATENT DOCUMENTS

2017/0148307 A1* 5/2017 Yeom .................... G06F 21/316
2017/0185757 A1* 6/2017 Yang ...................... G06F 21/31

FOREIGN PATENT DOCUMENTS

| | | | | |
|---|---|---|---|---|
| CN | 106385506 | A | 2/2017 | |
| CN | 106790523 | A | 5/2017 | |
| CN | 107734170 | A | 2/2018 | |
| CN | 108989534 | A | 12/2018 | |
| CN | 109145555 | A | 1/2019 | |
| CN | 109460660 | A | 3/2019 | |
| CN | 110365836 | A | 10/2019 | |
| CN | 111162975 | A * | 5/2020 | ......... H04L 12/2807 |
| WO | WO-2015067081 | A1 * | 5/2015 | ........ H04M 1/72597 |
| WO | 2019041183 | A1 | 3/2019 | |

* cited by examiner

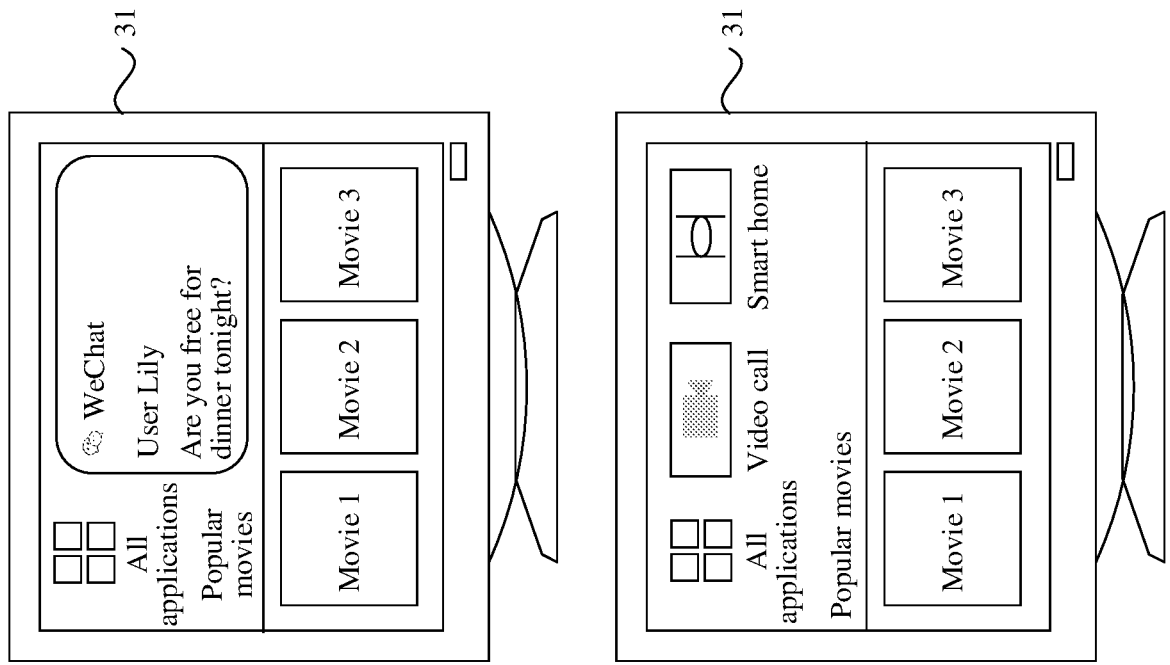
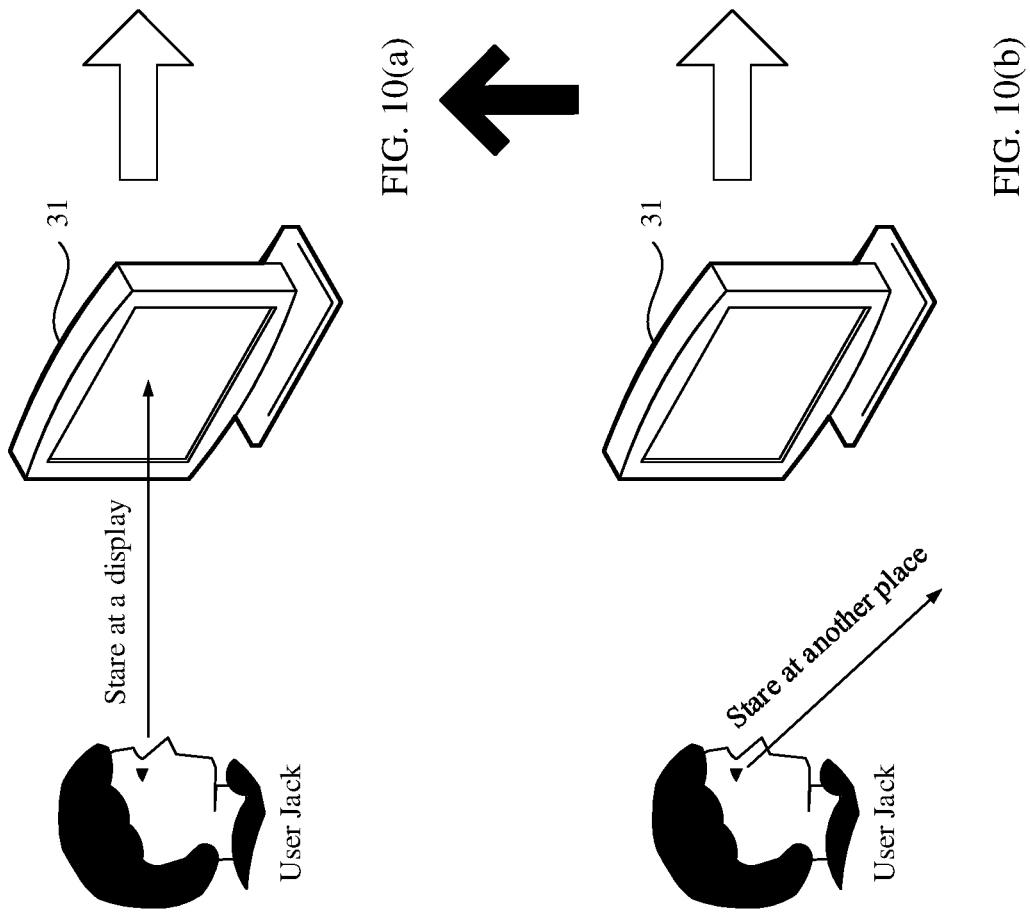
FIG. 10(a)
FIG. 10(b)

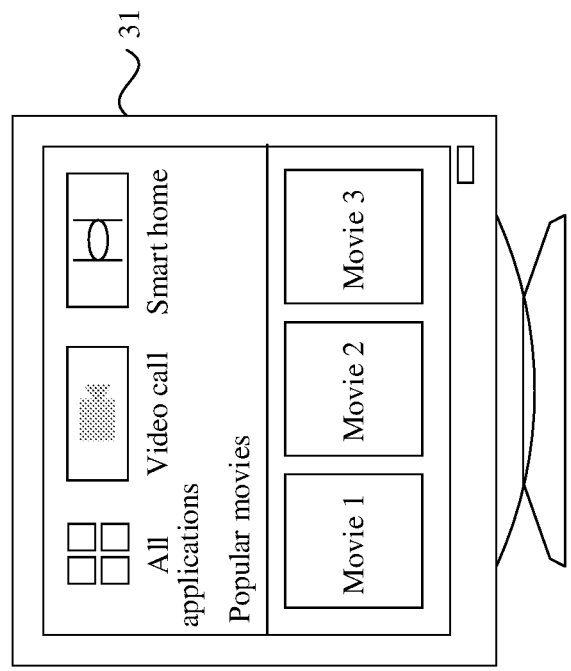
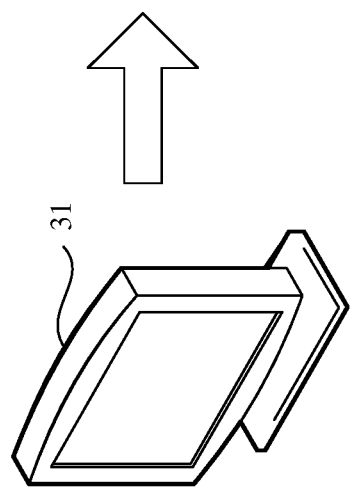
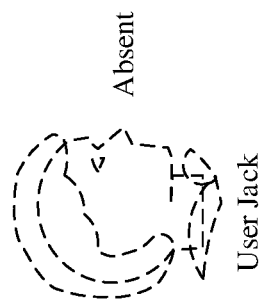
FIG. 10(c)

(a)          (b)

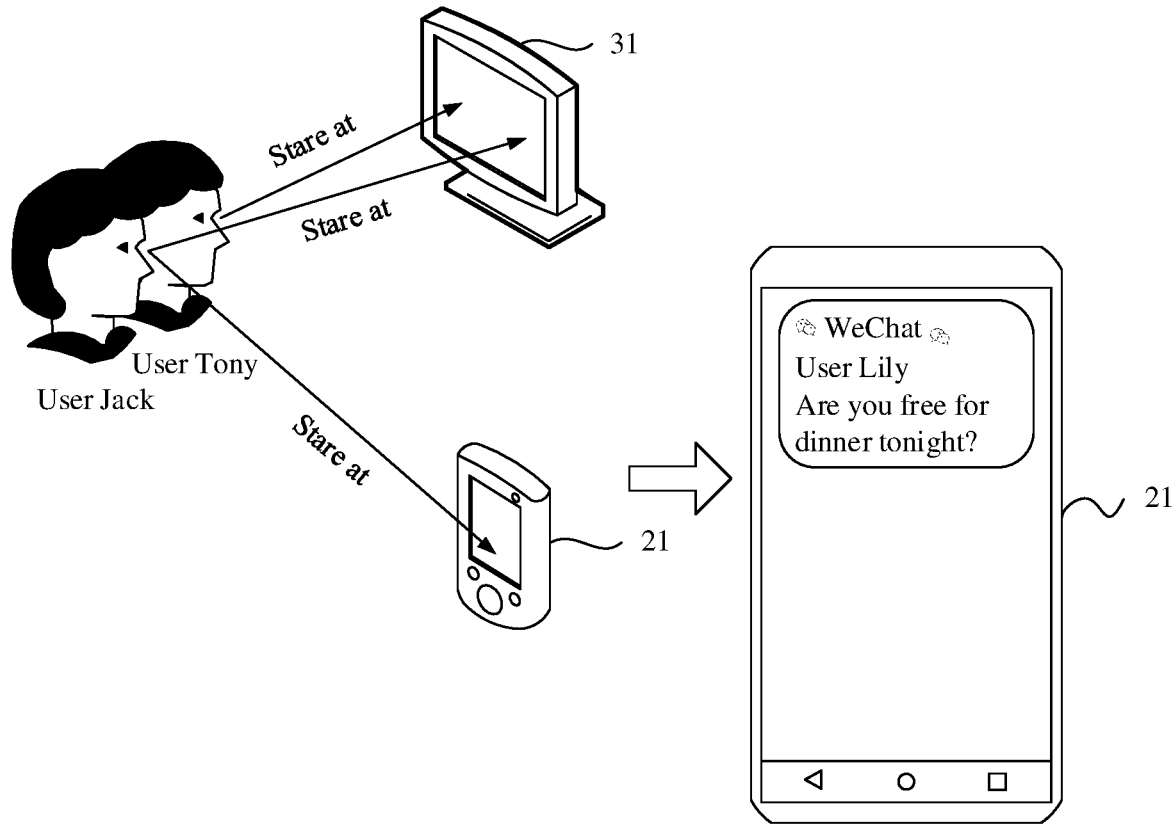

FIG. 16

| |
|---|
| If it is detected, based on identity information, that a plurality of users are currently using a target terminal, and it is detected that the target terminal includes only a public terminal, determine an urgency attribute of a notification |

S341

| |
|---|
| Determine a prompt occasion of the notification based on the urgency attribute of the notification, and when it is detected that the notification relates to privacy of a target user, control the public terminal to prompt the notification in a second prompt mode when the prompt occasion arrives |

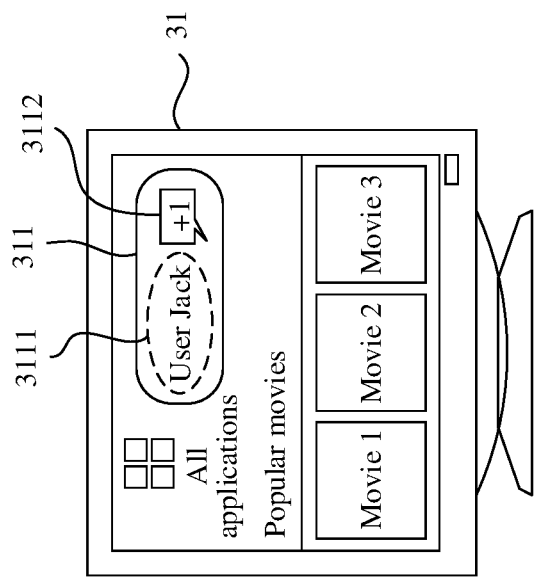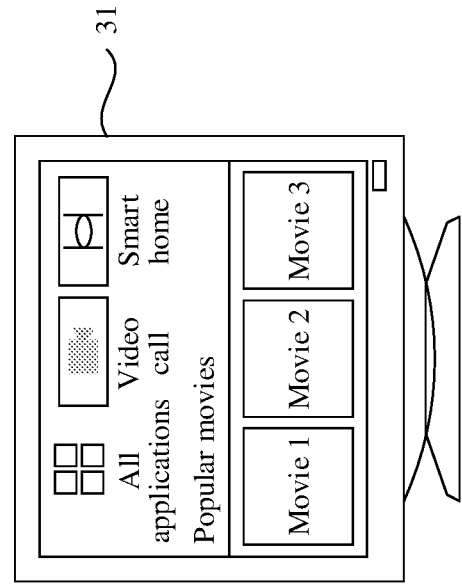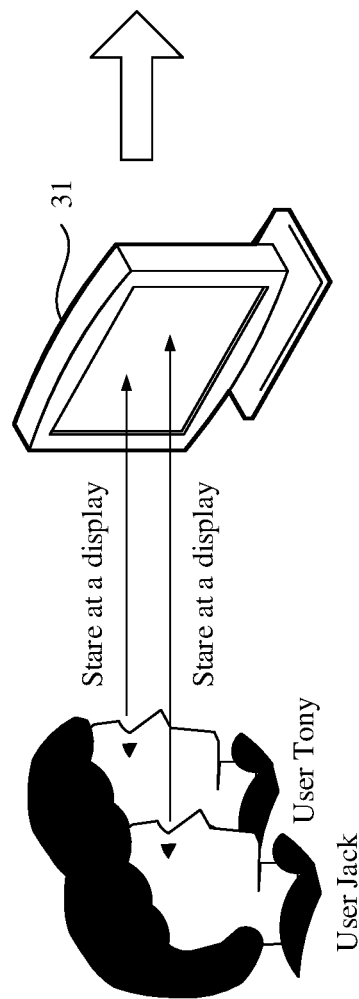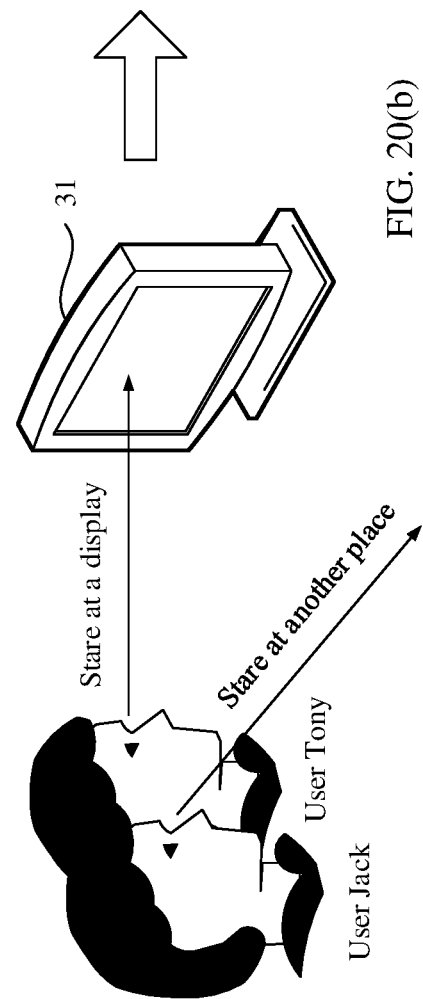
FIG. 20(a)
FIG. 20(b)

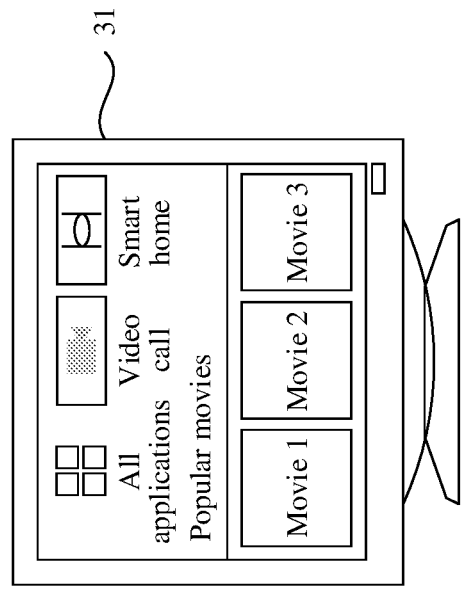
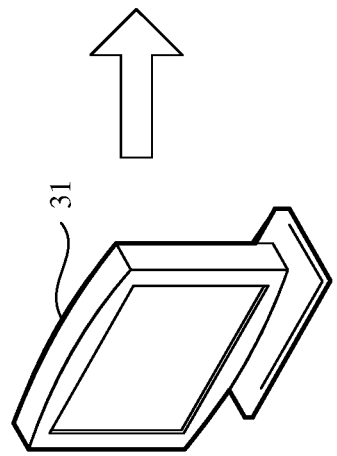
FIG. 20(c)
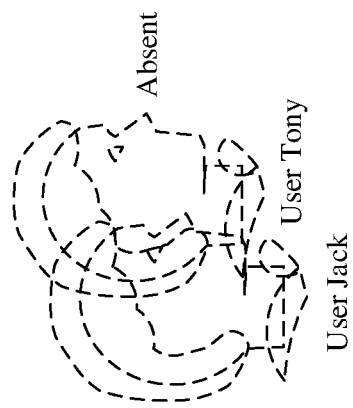

NOTIFICATION PROMPT METHOD, SERVER, AND STORAGE MEDIUM

CROSS-REFERENCE TO RELATED APPLICATIONS

This application is a continuation of International Application No. PCT/CN2020/125614, filed on Oct. 31, 2020, which claims priority to Chinese Patent 202010102629.2, filed on Feb. 19, 2020. The disclosures of the aforementioned applications are hereby incorporated by reference in their entireties.

TECHNICAL FIELD

This application relates to the field of communications technologies, and in particular, to a notification prompt method, a server, and a storage medium.

BACKGROUND

With the rapid development of informatization, people pay more and more attention to privacy of information. To protect personal privacy of a user, the conventional technology provides a notification prompt method. The notification prompt method allows the user to set a notification prompt mode on a terminal device. When the user does not want a notification received on the terminal device to be seen by others, the user may set the notification prompt mode of the terminal device to a mode in which a notification preview is not displayed. In this way, when receiving the notification, the terminal device only prompts the user with a source of the notification, for example, prompts which application or which user the notification is from, but does not display specific content of the notification. Therefore, a risk of leaking personal privacy of the user can be reduced. However, the foregoing notification prompt method depends on setting of a notification prompt mode by the user, and the terminal device always prompts a notification in the notification prompt mode set by the user without considering an actual application scenario. It can be learned that the existing notification prompt method has low intelligence of user privacy protection.

SUMMARY

Embodiments of this application provide a notification prompt method, a server, and a storage medium, to improve intelligence of user privacy protection while user privacy is protected.

According to a first aspect, embodiments of this application provide a notification prompt method, including: when a notification for a target user is received, determining a target terminal that meets a preset notification prompt condition from terminal devices on which an account of the target user is logged in; obtaining identity information of a user currently using the target terminal; and controlling, if it is detected, based on the identity information, that only the target user is currently using the target terminal, the target terminal to prompt the notification in a first prompt mode, wherein preview content of the notification is displayed in the first prompt mode; or controlling, if it is detected, based on the identity information, that a plurality of users are currently using the target terminal, the target terminal to prompt the notification in a second prompt mode, wherein preview content of the notification is not displayed in the second prompt mode.

For example, after the notification for the target user is received, before the target terminal that meets the preset notification prompt condition is determined from the terminal devices on which the account of the target user is logged in, the method further includes: detecting whether the notification is a notification allowing cross-device prompting; and correspondingly, the determining a target terminal that meets a preset notification prompt condition from terminal devices on which an account of the target user is logged in includes: when detecting that the notification is a notification allowing cross-device prompting, determining the target terminal that meets the preset notification prompt condition from the terminal devices on which the account of the target user is logged in.

For example, identity information of a user may be a facial feature of the user.

Based on this, after determining the target terminal, a server may send a preset facial image obtaining request to the target terminal. The preset facial image obtaining request is used to request to obtain a facial image of the user currently using the target terminal from the target terminal. After receiving the preset facial image obtaining request, the target terminal may start a preset camera to obtain the facial image of the user currently using the target terminal, and send the obtained facial image to the server. The preset camera is a camera associated with the target terminal. After receiving the facial image returned by the target terminal, the server extracts a facial feature from the facial image. The extracted facial feature is a facial feature of the user currently using the target terminal.

In a possible implementation of the first aspect, the controlling, if it is detected, based on the identity information, that only the target user is currently using the target terminal, the target terminal to prompt the notification in a first prompt mode includes: if it is detected, based on the identity information, that only the target user is currently using the target terminal, and it is detected that the target terminal includes a private terminal of the target user, controlling the private terminal to prompt the notification in the first prompt mode.

In a possible implementation of the first aspect, the controlling, if it is detected, based on the identity information, that only the target user is currently using the target terminal, the target terminal to prompt the notification in a first prompt mode includes: if it is detected, based on the identity information, that only the target user is currently using the target terminal, and it is detected that the target terminal includes only a public terminal, determining an urgency attribute of the notification; and determining a prompt occasion of the notification based on the urgency attribute of the notification, and controlling the public terminal to prompt the notification in the first prompt mode when the prompt occasion arrives.

For example, the user may predefine a prompt occasion of an urgent notification as a moment at which a terminal device receives a corresponding notification sent by the server, and a prompt occasion of a non-urgent notification as a moment at which a terminal device is in an idle state. Alternatively, the user may define a prompt occasion of a non-urgent notification as a moment at which the terminal device is in an idle state and a status of using the terminal device by the user is "in use".

In a possible implementation of the first aspect, the determining a prompt occasion of the notification based on the urgency attribute of the notification, and controlling the public terminal to prompt the notification in the first prompt mode when the prompt occasion arrives includes: if the urgency attribute of the notification is urgent, controlling the public terminal to prompt the notification in the first prompt mode when the notification is received; or controlling, if the urgency attribute of the notification is non-urgent, the public terminal to prompt the notification in the first prompt mode when the public terminal is in an idle state.

In a possible implementation of the first aspect, the controlling, if the urgency attribute of the notification is non-urgent, the public terminal to prompt the notification in the first prompt mode when the public terminal is in an idle state includes: if the urgency attribute of the notification is non-urgent, controlling the public terminal to prompt the notification in the first prompt mode when the public terminal is in the idle state and a status of using the public terminal by the target user is "in use".

For example, if the public terminal detects that the public terminal is currently in the idle state, and the status of using the public terminal by the target user is "in use", the public terminal immediately prompts the notification for the target user in the first prompt mode. If the public terminal detects that the public terminal is currently in a busy state, and the status of using the public terminal by the target user is "in use", the public terminal prompts the notification for the target user in the first prompt mode after the public terminal is changed from the busy state to the idle state. If the public terminal detects that the public terminal is currently in the idle state, but the status of using the public terminal by the target user is "not in use", the public terminal prompts the notification for the target user in the first prompt mode when the status of using the public terminal by the target user is changed from "not in use" to "in use".

In a possible implementation of the first aspect, when detecting that the public terminal is currently in the idle state but the status of using the public terminal by the target user is "not in use", the public terminal may alternatively prompt the notification for the target user in a notification prompt mode combining the first prompt mode and a ringtone mode and/or a voice broadcast mode.

In a possible implementation of the first aspect, after the controlling the public terminal to prompt the notification in the first prompt mode when the prompt occasion arrives further, the method further includes: if it is detected that a new terminal device in the terminal devices on which the account of the target user is logged in currently meets the preset notification prompt condition, the new terminal device includes a private terminal of the target user, and a user currently using the private terminal is the target user, controlling the public terminal to cancel the prompt of the notification, and controlling the private terminal to prompt the notification in the first prompt mode.

In a possible implementation of the first aspect, the controlling, if it is detected, based on the identity information, that a plurality of users are currently using the target terminal, the target terminal to prompt the notification in a second prompt mode includes: if it is detected, based on the identity information, that the plurality of users are currently using the target terminal, and it is detected that the target terminal includes a private terminal of the target user, when a plurality of users are currently using the private terminal, and the notification relates to privacy of the target user, controlling the private terminal to prompt the notification in the second prompt mode.

In a possible implementation of the first aspect, after the obtaining identity information of a user currently using the target terminal, the method further includes: if it is detected, based on the identity information, that the plurality of users are currently using the target terminal, and it is detected that the target terminal includes a private terminal of the target user, when a plurality of users currently using the private terminal include the target user, and the notification does not relate to privacy of the target user, controlling the private terminal to prompt the notification in the first prompt mode.

In a possible implementation of the first aspect, after the obtaining identity information of a user currently using the target terminal, the method further includes: if it is detected, based on the identity information, that the plurality of users are currently using the target terminal, and it is detected that the target terminal includes a private terminal of the target user, when a user currently using the private terminal includes only the target user, controlling the private terminal to prompt the notification in the first prompt mode.

In a possible implementation of the first aspect, the controlling, if it is detected, based on the identity information, that a plurality of users are currently using the target terminal, the target terminal to prompt the notification in a second prompt mode includes: if it is detected, based on the identity information, that the plurality of users currently using the target terminal include the target user, and it is detected that the target terminal includes only a public terminal, determining an urgency attribute of the notification; and determining a prompt occasion of the notification based on the urgency attribute of the notification, and when it is detected that the notification relates to privacy of the target user, controlling the public terminal to prompt the notification in the second prompt mode when the prompt occasion arrives.

In a possible implementation of the first aspect, the determining a prompt occasion of the notification based on the urgency attribute of the notification, and when it is detected that the notification relates to privacy of the target user, controlling the public terminal to prompt the notification in the second prompt mode when the prompt occasion arrives includes: if the urgency attribute of the notification is urgent, when it is detected that the notification relates to the privacy of the target user, controlling the public terminal to prompt the notification in the second prompt mode when the notification is received; or controlling, if the urgency attribute of the notification is non-urgent and when it is detected that the notification relates to the privacy of the target user, the public terminal to prompt the notification in the second prompt mode when the public terminal is in an idle state.

In a possible implementation of the first aspect, the controlling, if the urgency attribute of the notification is non-urgent and when it is detected that the notification relates to the privacy of the target user, the public terminal to prompt the notification in the second prompt mode when the public terminal is in an idle state includes: if the urgency attribute of the notification is non-urgent, when it is detected that the notification relates to the privacy of the target user, controlling, the public terminal to prompt the notification in the second prompt mode when the public terminal is in the idle state and a status of using the public terminal by the target user is "in use".

In a possible implementation of the first aspect, after the determining an urgency attribute of the notification, the method further includes: determining the prompt occasion of the notification based on the urgency attribute of the notification, and when it is detected that the notification does not relate to the privacy of the target user, controlling the public terminal to prompt the notification in the first prompt mode when the prompt occasion arrives.

In a possible implementation of the first aspect, after the determining an urgency attribute of the notification, the method further includes: determining the prompt occasion of the notification based on the urgency attribute of the notification, and when it is detected that the notification relates to the privacy of the target user and the plurality of users currently using the public terminal are all preset authorized users, controlling the public terminal to prompt the notification in the first prompt mode when the prompt occasion arrives.

In a possible implementation of the first aspect, after the controlling the public terminal to prompt the notification in the second prompt mode when the prompt occasion arrives further, the method further includes: if it is detected that a new terminal device in the terminal devices on which the account of the target user is logged in currently meets the preset notification prompt condition, the new terminal device includes a private terminal of the target user, and a user currently using the private terminal is the target user, controlling the public terminal to cancel the prompt of the notification, and controlling the private terminal to prompt the notification in the first prompt mode.

According to a second aspect, embodiments of this application provide a server, including: a first determining unit, configured to: when a notification for a target user is received, determine a target terminal that meets a preset notification prompt condition from terminal devices on which an account of the target user is logged in; a first obtaining unit, configured to obtain identity information of a user currently using the target terminal; and a first control unit, configured to: if it is detected, based on the identity information, that only the target user is currently using the target terminal, control the target terminal to prompt the notification in a first prompt mode, where preview content of the notification is displayed in the first prompt mode.

The first control unit is alternatively configured to: if it is detected, based on the identity information, that a plurality of users are currently using the target terminal, control the target terminal to prompt the notification in a second prompt mode, where preview content of the notification is not displayed in the second prompt mode.

According to a third aspect, embodiments of this application provide a server, including a memory, a processor, and a computer program that is stored in the memory and that can be run on the processor. When the processor executes the computer program, the notification prompt method according to the first aspect is implemented.

According to a fourth aspect, embodiments of this application provide a computer-readable storage medium. The computer-readable storage medium stores a computer program, and when the computer program is executed by a processor, the notification prompt method according to the first aspect is implemented.

According to a fifth aspect, embodiments of this application provide a computer program product. When the computer program product is run on a server, the server is enabled to perform the notification prompt method according to any one of the implementations of the first aspect.

Compared with the conventional technology, embodiments of this application have the following beneficial effects.

According to the notification prompt method provided in embodiments of this application, when receiving a notification for a target user, a server first determines a target terminal that meets a preset notification prompt condition from terminal devices on which an account of the target user is logged in, and then detects, based on identity information of a user currently using the target terminal, a quantity and identities of users currently using the target terminal. When detecting that only the target user is currently using the target terminal, the server controls the target terminal to prompt the notification for the target user in a prompt mode of displaying preview content of the notification. When detecting that a plurality of users are currently using the target terminal, the server controls the target terminal to prompt the notification for the target user in a prompt mode in which preview content of the notification is not displayed. That is, the server can intelligently adjust a notification prompt mode of the target terminal based on the quantity and identities of the users currently using the target terminal. Compared with the conventional technology, according to the notification prompt method provided in embodiments of this application, a user does not need to set a notification prompt mode on a terminal device, and intelligence of user privacy protection can be improved while user privacy is protected.

BRIEF DESCRIPTION OF THE DRAWINGS

FIG. 10(a) to FIG. 10(c) are a schematic diagram of a specific scenario to which a notification prompt method is applicable according to another embodiment of this application;

FIG. 16 is a schematic diagram of a specific scenario to which a notification prompt method is applicable according to another embodiment of this application;

FIG. 17 is a specific schematic flowchart of S34 in a notification prompt method according to an embodiment of this application;

FIG. 20(*a*) to FIG. 20(*c*) are a schematic diagram of a specific scenario to which a notification prompt method is applicable according to another embodiment of this application;

DETAILED DESCRIPTION OF ILLUSTRATIVE EMBODIMENTS

Figure 1:
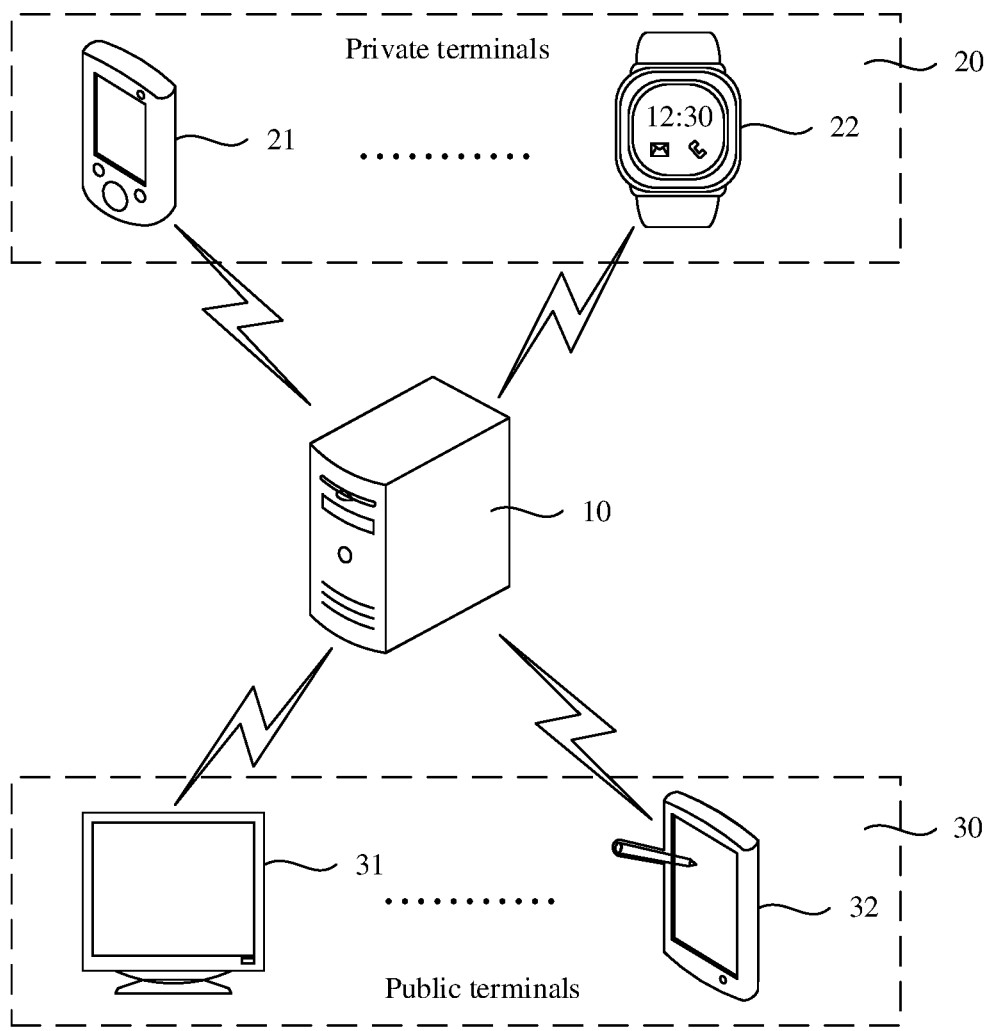
FIG. 1 is a schematic diagram of a structure of a notification prompt system in which a notification prompt method is used according to an embodiment of this application.

In the following description, to illustrate rather than limit, specific details such as a particular system structure, and a technology are provided to make a thorough understanding of embodiments of this application. However, persons skilled in the art should know that this application may also be implemented in other embodiments without these specific details. In other cases, detailed descriptions of well-known systems, apparatuses, circuits, and methods are omitted, so that this application is described without being obscured by unnecessary details.

It should be understood that, when used in the specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this application refers to any combination and all possible combinations of one or more associated listed items, and includes these combinations.

As used in the specification and the appended claims of this application, according to the context, the term "if" may be interpreted as "when" or "once" or "in response to determining" or "in response to detecting". Similarly, according to the context, the phrase "if it is determined that" or "if (a described condition or event) is detected" may be interpreted as a meaning of "once it is determined that" or "in response to determining" or "once (a described condition or event) is detected" or "in response to detecting (a described condition or event)".

In addition, in the specification and the appended claims of this application, the terms "first", "second", "third", and the like are merely used for distinguishing description, and shall not be understood as an indication or implication of relative importance.

Reference to "an embodiment", "some embodiments", or the like described in the specification of this application indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

Specific embodiments are used below to describe in detail the technical solutions of this application. The following several specific embodiments may be combined with each other, and a same or similar concept or process may not be described repeatedly in some embodiments.

FIG. 1 is a schematic diagram of a structure of a notification prompt system in which a notification prompt method is used according to an embodiment of this application. As shown in FIG. 1, the notification prompt system provided in embodiments of this application may include a server 10 and terminal devices. The terminal device may be a terminal device on which an account of any user is logged in. When an account of a user is logged in on a terminal device, the terminal device may receive a notification pushed by the server 10 for the account of the user.

In embodiments of this application, the account of the user may be a private account of the user, or may be an associated account of the user. The private account of the user may be an account registered in the server 10 based on personal identity information of the user. The associated account of the user may be another account associated with the private account of the user, and the another account may also be an account registered in the server 10.

In a possible implementation of this embodiment, the another account associated with the private account of the user may be an account of another user that is in a same preset relationship group as the user. The account of the another user may be an account registered in the server 10 based on personal identity information of the another user. The preset relationship may be a close social relationship. For example, the preset relationship may include but is not limited to a relative and a colleague. Correspondingly, the preset relationship group may include but is not limited to a family group, a working group, and the like.

In another possible implementation of this embodiment, the another account associated with the private account of the user may alternatively be an account that has established an association relationship with the private account of the user in advance and that is authorized by the user to receive a notification for the private account of the user. In this implementation, the server 10 may store, in advance, the account that has established an association relationship with the private account of the user and that is authorized to receive a notification for the private account of the user.

In an embodiment of this application, an account type may be an application account. Correspondingly, the server 10 may be an application server. For example, the account of the user may be an application account such as a WeChat account, an Alipay account, or a Taobao account. Correspondingly, the server 10 may be a WeChat server, an Alipay server, or a Taobao server.

In another embodiment of this application, an account type may alternatively be a device manufacturer account. Correspondingly, the server 10 may be a device manufacturer server. For example, the account of the user may be a device manufacturer account such as a Huawei account or an Apple account. Correspondingly, the server 10 may be a Huawei server, an Apple server, or the like.

In still another embodiment of this application, an account type may alternatively be an operator account. Correspondingly, the server 10 may be an operator server. For example, the account of the user may be a mobile phone number provided by a mobile operator. Correspondingly, the server 10 may be a mobile operator server. In another embodiment of this application, the account of the user may alternatively be an account of another type. A specific type of the account of the user is not limited in this application.

In embodiments of this application, a terminal device on which the account of the user is logged in may include a private terminal 20 of the user and/or a public terminal 30.

In a possible implementation of this embodiment, the private terminal 20 of the user may be a terminal device on which only one account is usually logged in and that is used by a user matching the account for a long time. A user matching an account is a user whose identity information is the same as user identity information used for registration of the account. The user identity information may include but is not limited to information that can uniquely identify an identity of the user, such as an identity card number of the user, an email address of the user, or a biometric feature of the user. The biometric feature of the user may include but is not limited to a fingerprint, a voiceprint, an iris, a facial feature, and the like of the user. The public terminal 30 may be a terminal device on which at least one account has logged in and that is usually used by a plurality of associated users. The associated users may be a plurality of users in a same preset relationship group, or may be a plurality of users for which association relationships have been established in advance. It should be noted that the preset relationship group has been explained in the foregoing content, and details are not described herein again.

In this implementation, the server 10 may determine a type of each terminal device in the notification prompt system based on a quantity of logged-in accounts on the terminal device, and a quantity and identity information of users using the terminal device. The type of the terminal device may include but is not limited to a private terminal and a public terminal. Specifically, the terminal device may obtain identity information of a user each time the user uses the terminal device, and send the obtained identity information of the user and a currently logged-in user account on the terminal device to the server 10. When detecting that only one account is usually logged in on a terminal device and the terminal device is used by one user matching the account for a long time, the server 10 may determine the terminal device as a private terminal. When detecting that at least one account is logged in on a terminal device and the terminal device is usually used by a plurality of associated users, the server 10 may determine the terminal device as a public terminal. For example, the identity information of the user includes voiceprint information. It is assumed that user voiceprint information used for registration of an account A is a voiceprint 1. If the server 10 detects that only the account A is usually logged in on a terminal device a, and the terminal device a is used by a user Jack whose voiceprint information is the voiceprint 1 for a long time, the server 10 may determine the terminal device a as a private terminal of the user Jack. If the server 10 detects that the account A and an account B have been logged in on a terminal device b, the terminal device b is usually used by the user Jack whose voiceprint information is the voiceprint 1, a user Lily whose voiceprint information is a voiceprint 2, and a user Tony whose voiceprint information is a voiceprint 3, and the user Jack, the user Lily, and the user Tony are in a same family group, the server 10 may determine the terminal device b as a public terminal.

In another possible implementation of this embodiment, a user may further predefine a device type of each terminal device used by the user, and the device type may include but is not limited to a private terminal and a public terminal. In this implementation, the server 10 may store identifiers of all private terminals 20 predefined by the user in a private terminal list, and store identifiers of all public terminals 30 predefined by the user in a public terminal list. In a subsequent notification prompt process, the server 10 may determine a device type of a to-be-identified terminal device through table lookup based on an identifier of the to-be-identified terminal device. The identifier of the terminal device may be a sequence number of the terminal device, a name of the terminal device, or the like.

It should be noted that, when the user defines a device type of each terminal device used by the user, the server 10 preferentially determines the device type of each terminal device in the notification prompt system based on the device type of each terminal device defined by the user.

Figure 2:
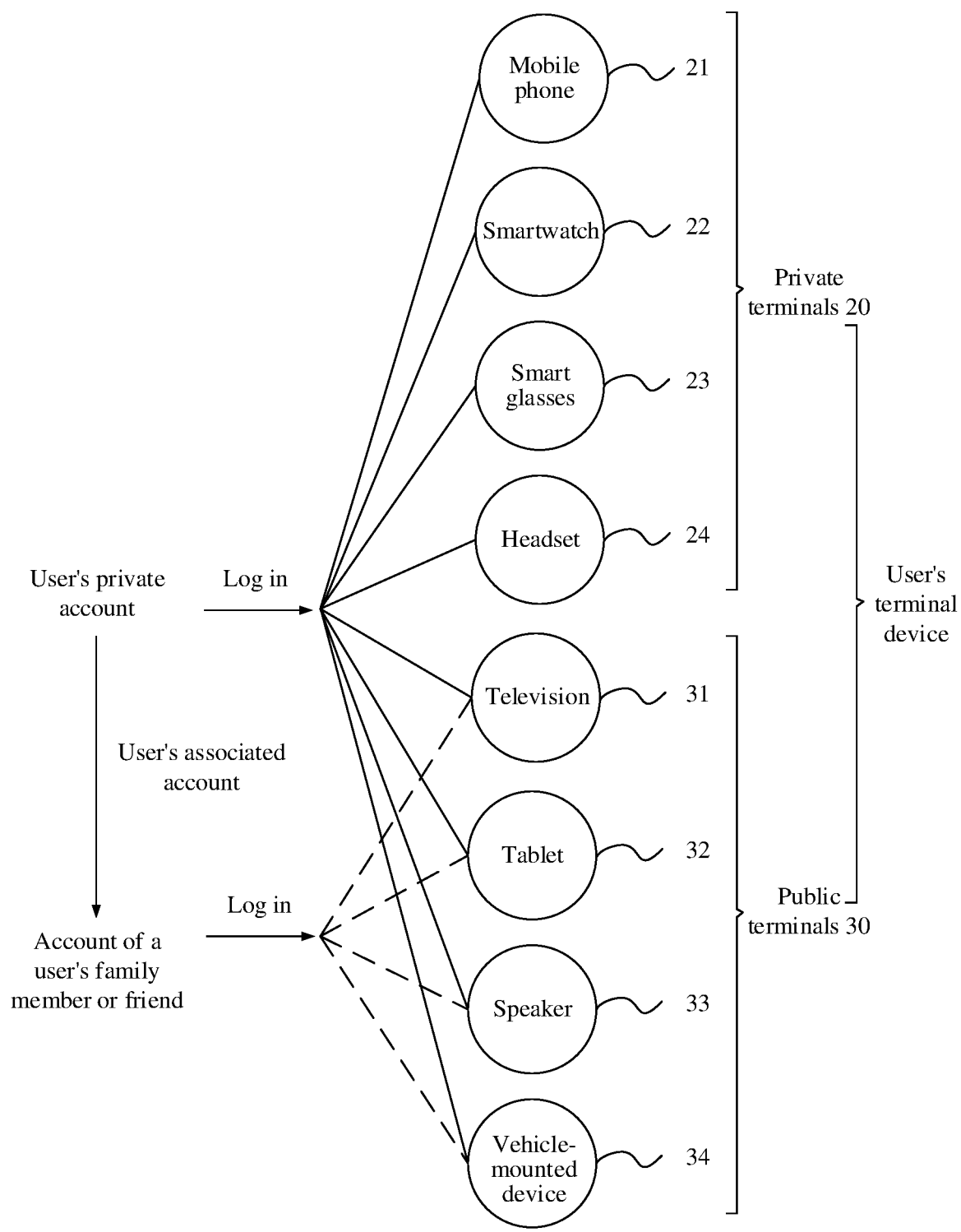
FIG. 2 is a schematic diagram of a login status of an account of a user on each terminal device of the user according to an embodiment of this application.

For example, FIG. 2 is a schematic diagram of a login status of an account of a user on each terminal device of the user according to an embodiment of this application. As shown in FIG. 2, private terminals 20 of the user may include but are not limited to a mobile phone 21, a smartwatch 22, smart glasses 23, a headset 24, and the like, and public terminals 30 may include but are not limited to a television 31, a tablet computer 32, a speaker 33, a vehicle-mounted device 34, and the like. Usually, the private account of the user may be logged in on the private terminals 20 of the user and the public terminals 30, and the associated account of the user is generally logged in on only the public terminals 30. Regardless of whether the private account of the user or the associated account of the user is logged in on a terminal device, the terminal device can receive a notification pushed by the server 10 for the user.

Figure 3:
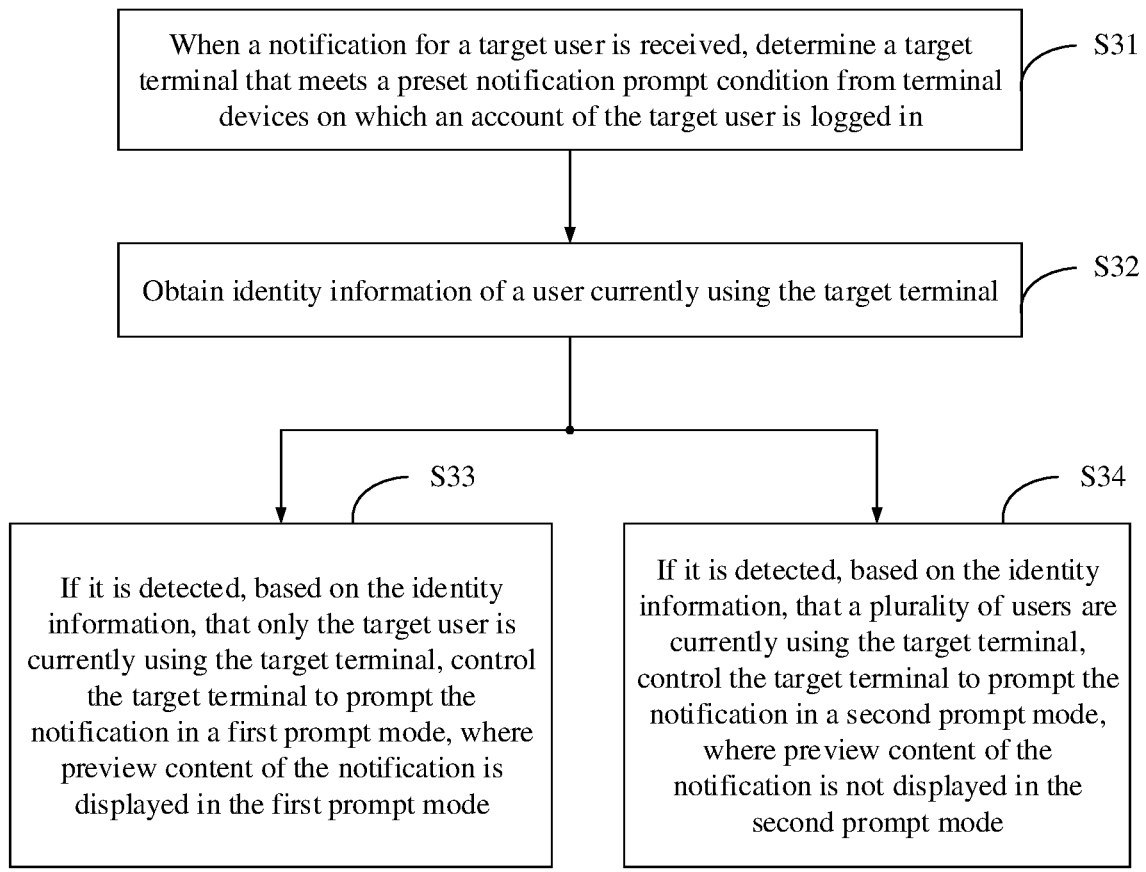
FIG. 3 is a schematic flowchart of a notification prompt method according to an embodiment of this application.

FIG. 3 is a schematic flowchart of a notification prompt method according to an embodiment of this application. In this embodiment, a procedure may be performed by the server 10 in FIG. 1. The server 10 may be an application server, a device manufacturer server, an operator server, or the like. A specific type of the server is not limited herein. As shown in FIG. 3, the notification prompt method provided in this embodiment includes S31 to S34. Details are as follows.

S31: When a notification for a target user is received, determine a target terminal that meets a preset notification prompt condition from terminal devices on which an account of the target user is logged in.

The target user in this embodiment may be a user that owns an account registered in the server. For ease of description, in this embodiment, the target user is any user that owns an account registered in the server. The account that is registered in the server and that is owned by the target user may include a private account of the target user, or may include an associated account of the target user. The terminal device on which the account of the target user is logged in may be a terminal device on which the private account of the target user is logged in, or may be a terminal device on which the associated account of the target user is logged in. Further, the terminal device on which the account of the target user is logged in may include a private terminal of the user or may include a public terminal.

In this embodiment, when the server works normally, if the server receives a notification for the private account or the associated account of the target user, the server considers that the notification for the target user is received. In this case, the server needs to push the notification to the terminal device on which the account of the target user is logged in, so that the terminal device on which the account of the target user is logged in prompts the target user with the notification.

In a possible implementation of this embodiment, when the server detects that there are a plurality of terminal devices on which the account of the target user is logged in, to avoid interference to the user caused by simultaneously prompting a notification on the plurality of different terminal devices, and to ensure that the target user does not miss a notification related to the target user, the server may determine the target terminal that meets the preset notification prompt condition from the terminal devices on which the account of the target user is logged in, and control only the target terminal to prompt the notification for the target user. In actual application, there may be one or more target terminals that meet the preset notification prompt condition.

The preset notification prompt condition is used to limit a terminal device that is currently allowed to prompt the notification, and "currently" is a moment at which the server receives the notification for the target user.

In an embodiment of this application, the preset notification prompt condition may be that the terminal device is in a using state. That is, in this embodiment, the server may determine, as the target terminal, a terminal device that is currently in the using state and that is in the terminal devices on which the account of the target user is logged in. That the terminal device is currently in the using state may be that the terminal device is currently executing a preset process, or the terminal device is currently in a screen-on state, or the terminal device is currently being operated by a user, or the like. The preset process may be a process that can be executed regardless of whether the terminal device is in a screen-on state or a screen-off state. For example, the preset process may be a music play process. For example, if a WeChat account of a user Jack is logged in on both a computer and a mobile phone of the user Jack, when a WeChat server receives a WeChat notification for the user Jack, if it is detected that the computer of the user Jack is currently playing a video or is being operated by the user, and the mobile phone of the user Jack is currently in a screen-off state and neither executes any process nor is operated by the user, the server determines the computer of the user Jack as the target terminal. The server subsequently pushes the WeChat notification for the user Jack to only the computer of the user Jack.

In actual application, the notification for the target user received by the server may be a notification allowing cross-device prompting, or may be a notification not allowing cross-device prompting. The notification allowing cross-device prompting is a notification allowing prompting on a plurality of different terminal devices, and the notification not allowing cross-device prompting is a notification allowing prompting on only one terminal device. Some terminal devices cannot receive a notification allowing cross-device prompting. Therefore, in another embodiment of this application, the preset notification prompt condition may alternatively be: The terminal device is a device that can receive a notification allowing cross-device prompting, and the terminal device is in a using state. Based on this, in this embodiment, when receiving the notification for the target user, the server may first determine, from the terminal devices on which the account of the target user is logged in, candidate devices that can receive the notification allowing cross-device prompting, and then determine a terminal device currently in the using state in the candidate devices as the target terminal. In specific application, notification receiving permission of each terminal device usually used by the target user may be set in advance. The notification receiving permission may include: allowing receiving of a notification allowing cross-device prompting and not allowing receiving of a notification allowing cross-device prompting. In a subsequent notification prompt process, the server may obtain notification receiving permission of each terminal device on which the account of the target user is logged in, to determine, from the terminal devices on which the account of the target user is logged in, a candidate device that can receive the notification allowing cross-device prompting.

The notification for the target user received by the server may be a notification allowing cross-device prompting, or may be a notification not allowing cross-device prompting. Therefore, in a possible implementation of this embodiment, after the server receives the notification for the target user, before the server determines the target terminal from the terminal devices on which the account of the target user is logged in, the following step may be further included: detecting whether the notification is a notification allowing cross-device prompting.

In specific application, a notification type included in the notification allowing cross-device prompting may be predefined. For example, the notification type may include but is not limited to an instant message notification, a call notification, and the like. For example, it may be predefined that the notification allowing cross-device prompting includes an instant message notification. Based on this, when receiving the notification for the target user, the server may first determine a notification type of the notification, and then detect, based on the notification type of the notification, whether the notification is a notification allowing cross-device prompting. Specifically, if the server detects that the notification type of the notification for the target user is included in the predefined notification type included in the notification allowing cross-device prompting, the server determines that the notification for the target user is a notification allowing cross-device prompting.

In this implementation, only when detecting that the notification for the target user is a notification allowing cross-device prompting, the server determines the target terminal that meets the preset notification prompt condition from the terminal devices on which the account of the target user is logged in.

In this embodiment, when the account of the target user has logged in on a plurality of terminal devices, only a target terminal in a using state is controlled to prompt the notification for the target user, so that the target user can receive a notification related to the target user in time. In addition, because not all terminal devices on which the account of the target user has logged in prompt the notification for the target user, interference caused by notification prompting to the user can be reduced.

S32: Obtain identity information of a user currently using the target terminal.

In this embodiment, to reduce a risk of leaking personal privacy of a user, after determining the target terminal that meets the preset notification prompt condition, and before controlling the target terminal to prompt the notification for the target user, the server further needs to detect a quantity and identities of users currently using the target terminal. By way of example, and not limitation, the user currently using the target terminal may be a user currently staring at a display of the target terminal.

Specifically, the server may obtain the identity information of the user currently using the target terminal, detect, based on the identity information of the user currently using the target terminal, a quantity and identities of users currently using the target terminal, and further determine, based on a detection result, a manner of prompting the notification for the target user by the target terminal. The prompt mode in this embodiment may include a first prompt mode and a second prompt mode. Preview content of the notification is displayed in the first prompt mode, and the preview content of the notification is not displayed in the second prompt mode. In actual application, the preview content of the notification may be all content included in the notification, or may be some content included in the notification.

To prevent interference to the user when the identity information of the user currently using the target terminal is obtained, and considering that when the user is using the target terminal, a face of the user usually faces the display of the target terminal, in a preferred implementation of this embodiment, the identity information of the user may be a facial feature of the user. After determining the target terminal that meets the preset notification prompt condition, the server may obtain the facial feature of the user currently using the target terminal.

Figure 4:
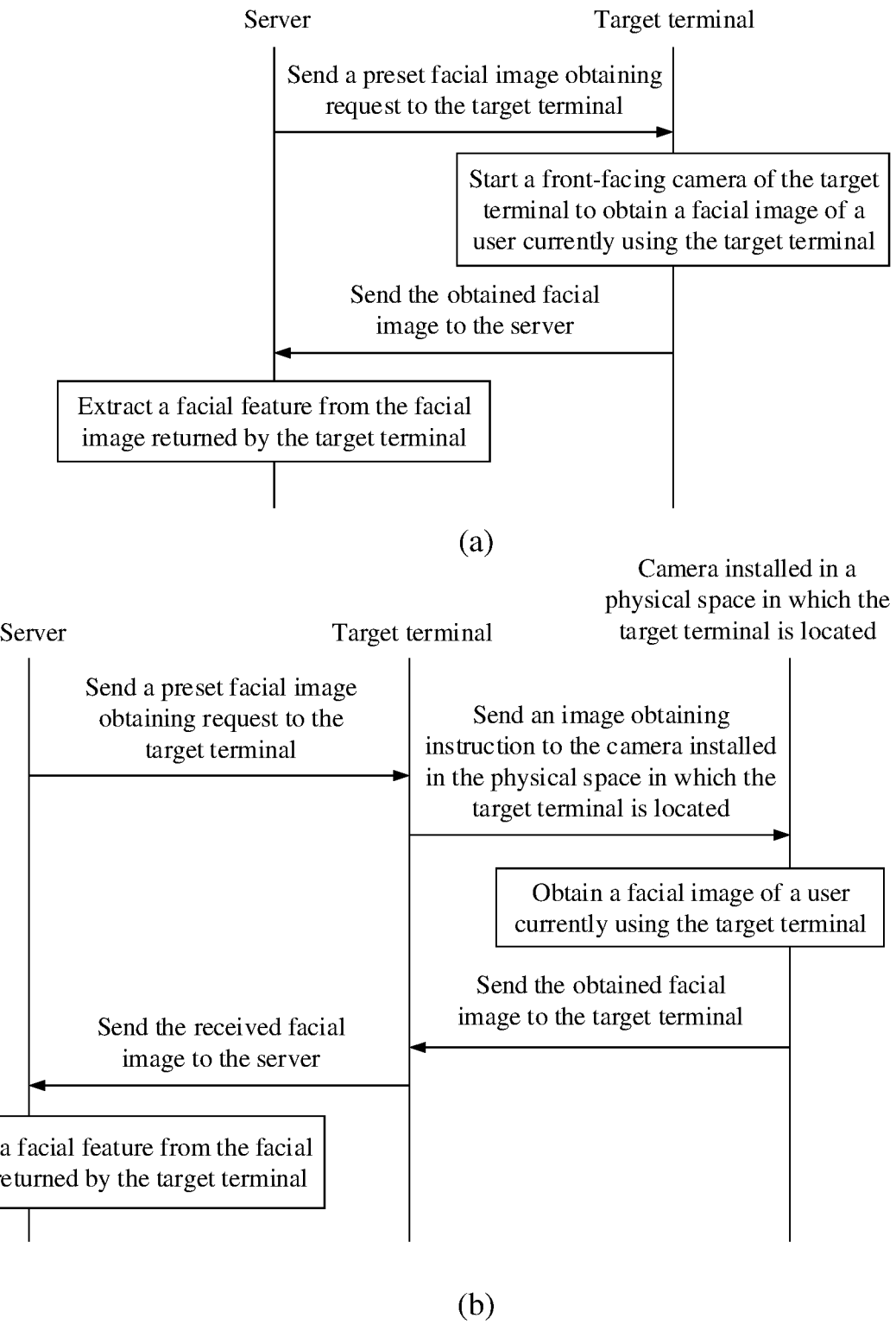
FIG. 4 is a schematic flowchart of two specific implementations of S32 in a notification prompt method according to an embodiment of this application.

Specifically, FIG. 4 is a schematic flowchart of two specific implementations of S32 in this embodiment. As shown in FIG. 4, in this implementation, after determining the target terminal, the server may send a preset facial image obtaining request to the target terminal. The preset facial image obtaining request is used to request to obtain a facial image of the user currently using the target terminal from the target terminal. After receiving the preset facial image obtaining request, the target terminal may start a preset camera to obtain the facial image of the user currently using the target terminal, and send the obtained facial image to the server. The preset camera is a camera associated with the target terminal. In a specific implementation, the camera associated with the target terminal may be a front-facing camera of the target terminal. As shown in (a) in FIG. 4, in this implementation, the target terminal may directly start the front-facing camera of the target terminal to obtain the facial image of the user currently using the target terminal. In another specific implementation, when the target terminal is a terminal device fixedly disposed in a physical space, the camera associated with the target terminal may alternatively be a camera installed in the physical space in which the target terminal is located. In this implementation, an association relationship may be established in advance between the target terminal and the camera installed in the physical space in which the target terminal is located. Based on this, as shown in (b) in FIG. 4, after receiving the preset facial image obtaining request, the target terminal may send an image obtaining instruction to the camera installed in the physical space in which the target terminal is located, to control the camera to obtain the facial image of the user currently using the target terminal. After obtaining the facial image of the user currently using the target terminal, the camera installed in the physical space in which the target terminal is located sends the facial image to the target terminal. The target terminal sends the received facial image to the server. After receiving the facial image returned by the target terminal, the server extracts a facial feature from the facial image. The extracted facial feature is a facial feature of the user currently using the target terminal.

It should be noted that, in actual application, the server may extract one or more facial features from the facial image. Specifically, when the server extracts one facial feature from the facial image, the server may consider that only one user is currently using the target terminal. When the server extracts a plurality of facial features from the facial image, the server may consider that a plurality of users are currently using the target terminal.

A user may make a sound in a process of using the target terminal. For example, when a plurality of users watch a video on the target terminal, different users may communicate with each other. Therefore, in another possible implementation of this embodiment, the identity information of the user may further include voiceprint information of the user. The server may obtain the voiceprint information of the user currently using the target terminal, and identify an identity of the user currently using the target terminal based on the voiceprint information of the user currently using the target terminal. In this implementation, after determining the target terminal, the server may send a preset voice information obtaining request to the target terminal. The preset voice information obtaining request is used to request to obtain voice information of the user currently using the target terminal from the target terminal. After receiving the preset voice information obtaining request, the target terminal may start a preset microphone to obtain the voice information of the user currently using the target terminal, and send the obtained voice information to the server. The preset microphone is a microphone associated with the target terminal. In a specific implementation, the microphone associated with the target terminal may be a microphone built in the target terminal. In this implementation, the target terminal may directly start the built-in microphone of the target terminal to obtain the voice information of the user currently using the target terminal. In another specific implementation, the microphone associated with the target terminal may alternatively be a microphone that is not built in the target terminal but is communicatively connected to the target terminal. In this implementation, after receiving the preset voice information obtaining request, the target terminal may start the microphone communicatively connected to the target terminal to obtain the voice information of the user currently using the target terminal. After obtaining the voice information of the user currently using the target terminal, the target terminal sends the voice information to the server. After receiving the voice information returned by the target terminal, the server extracts voiceprint information from the voice information. The extracted voiceprint information is the voiceprint information of the user currently using the target terminal.

It should be noted that, in actual application, the server may extract one or more pieces of voiceprint information from the voice information. Specifically, when the server extracts one piece of voiceprint information from the voice information, the server may consider that only one user is currently using the target terminal. When the server extracts a plurality of pieces of voiceprint information from the voice information, the server may consider that a plurality of users are currently using the target terminal.

In actual application, accuracy of detecting, by using only the voiceprint information, the quantity and identities of the users currently using the target terminal is low. Therefore, in still another possible implementation of this embodiment, the server may further comprehensively detect, based on the facial feature and the voiceprint information of the user, the quantity and identities of the users currently using the target terminal. Specifically, in this implementation, after determining the target terminal, the server may simultaneously send a preset facial image obtaining request and a preset voice information obtaining request to the target terminal, to obtain a facial feature and voiceprint information of the user currently using the target terminal. It should be noted that, in this implementation, a manner in which the server obtains the facial feature and the voiceprint information of the user currently using the target terminal is the same as a manner in which the server obtains the facial feature and the voiceprint information of the user currently using the target terminal in the foregoing implementation. For details, refer to related descriptions in the foregoing implementation. Details are not described herein again.

In this implementation, when the server extracts one facial feature from the facial image, and the voiceprint information extracted from the voice information corresponds to only one user, the server may consider that only one user is currently using the target terminal. When the server extracts a plurality of facial features from the facial image, or the voiceprint information extracted from the voice information corresponds to a plurality of users, the server may consider that a plurality of users are currently using the target terminal.

In the foregoing implementation, to obtain the identity information of the user currently using the target terminal, the preset camera and/or the preset microphone may be directly started to obtain the identity information, and the user does not need to perform any additional operation. For example, the user does not need to input the identity information of the user. This avoids unnecessary interference to the user when the identity information of the user is obtained.

In this embodiment, when detecting, based on the identity information of the user currently using the target terminal, that only one user is currently using the target terminal, the server further needs to determine whether the user currently using the target terminal is the target user. When determining whether the user currently using the target terminal is the target user, the server further needs to obtain identity information of the target user for reference. In an implementation of this embodiment, if the notification received by the server is a notification for a private account of the target user, the server may obtain user identity information used for registration of the private account, and the identity information is the identity information of the target user. In another implementation of this embodiment, if the notification received by the server is a notification for an associated account of the target user, the server may first determine a user's private account associated with the associated account, and then obtain user identity information used for registration of the private account, and the identity information is the identity information of the target user. After obtaining the identity information of the target user, the server compares the identity information of the user currently using the target terminal with the identity information of the target user. When detecting that the identity information of the user currently using the target terminal is the same as the identity information of the target user, the server determines that the user currently using the target terminal is the target user. In this case, the server performs S33.

In this embodiment, when the server detects, based on the identity information of the user currently using the target terminal, that a plurality of users are currently using the target terminal, S34 may be directly performed.

S33: If it is detected, based on the identity information, that only the target user is currently using the target terminal, control the target terminal to prompt the notification in the first prompt mode, where the preview content of the notification is displayed in the first prompt mode.

In this embodiment, when detecting that one user is currently using the target terminal and the user is the target user, the server determines that a prompt mode of the notification on the target terminal is the first prompt mode. The preview content of the notification may be displayed in the first prompt mode.

Specifically, the server may send, to the target terminal, the notification for the target user received by the server and the prompt mode that is of the notification on the target terminal and that is determined by the server. Because the prompt mode that is of the notification on the target terminal and that is determined by the server is the first prompt mode in this embodiment, after receiving the notification for the target user from the server, the target terminal prompts the notification for the target user in the first prompt mode.

In actual application, when prompting the notification for the target user in the first prompt mode, the target terminal may prompt the notification for the target user by using a notification prompt box. Specifically, information prompted by the target terminal in the notification prompt box may include but is not limited to: a type of the notification, a source of the notification, preview content of the notification, a time point at which the notification is received, and the like. The type of the notification is used to identify a service type for which the notification is intended. For example, the type of the notification may include but is not limited to an SMS message, a call, WeChat, and the like. The source of the notification is used to identify a user from which the notification is. By way of example, and not limitation, the target terminal may display the notification prompt box in an area that is on the display and that is close to a top border of the display.

Figure 5:
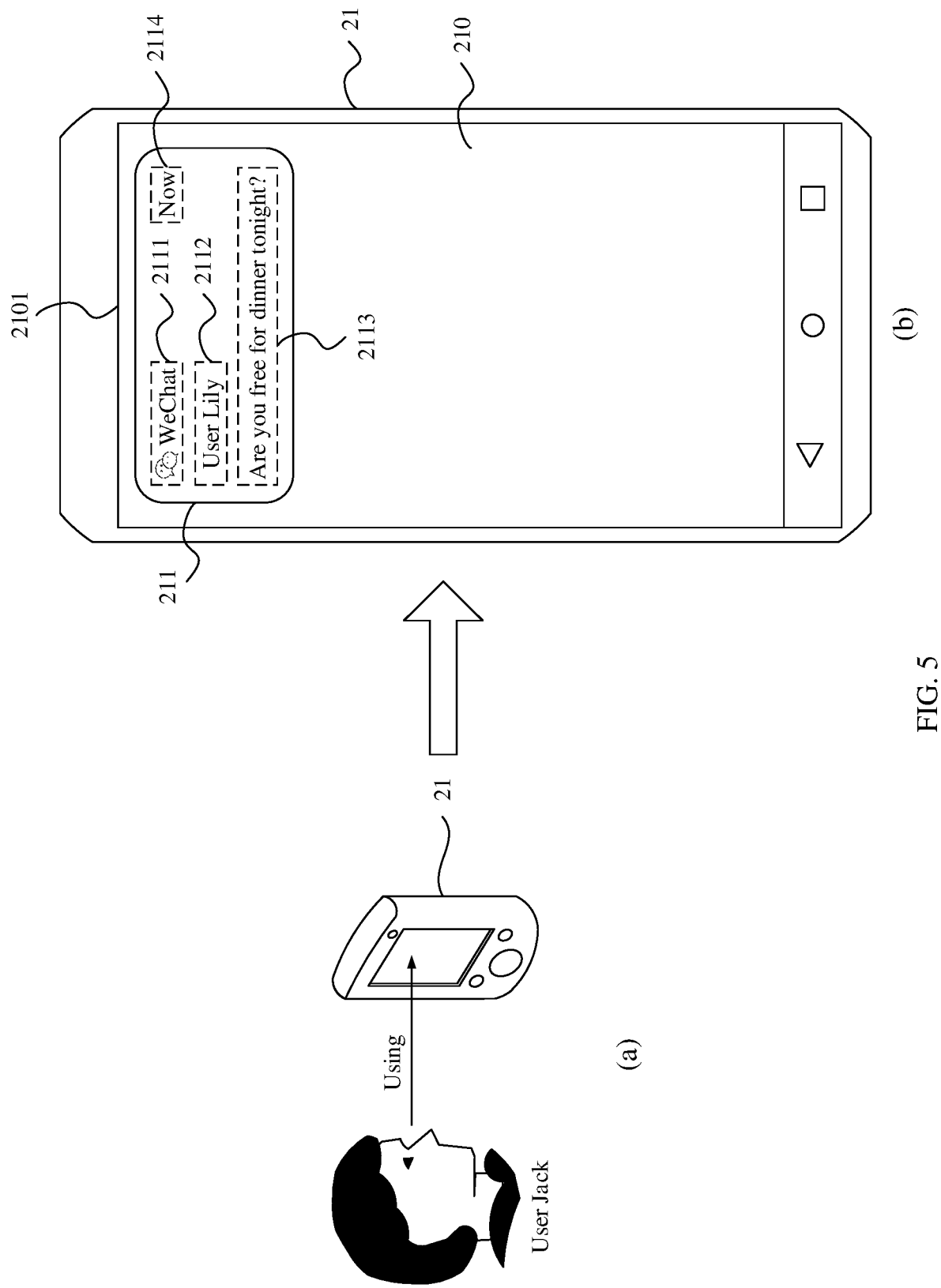
FIG. 5 is a schematic diagram of a specific scenario of a notification prompt method when only a target user is currently using a target terminal according to an embodiment of this application.

For example, FIG. 5 is a schematic diagram of a specific scenario of a notification prompt method when only the target user is currently using the target terminal according to this embodiment. In this scenario, it is assumed that a notification received by the server is a WeChat notification for a target user Jack, the WeChat notification is from a user Lily, and specific content of the notification is "Are you free for dinner tonight?". As shown in (a) in FIG. 5, assuming that the target terminal includes a mobile phone 21 of the user Jack, and only the target user Jack is using the target terminal, as shown in (b) in FIG. 5, the mobile phone 21 of the user Jack may prompt the notification by using a notification prompt box 211. Specifically, information prompted by the mobile phone 21 in the notification prompt box 211 may include but is not limited to: a type 2111 of the notification, a source 2112 of the notification, specific content 2113 of the notification, and/or a time point 2114 at which the notification is received. For example, the mobile phone 21 may display the notification prompt box 211 in an area that is on a display 210 and that is close to a top border 2101 of the display.

In this implementation, the server controls, only when detecting that only the target user is currently using the target terminal, the target terminal to prompt the notification for the target user in a prompt mode of displaying the preview content of the notification, so that a risk of leaking personal privacy of the user can be reduced.

In actual application, the terminal devices on which the account of the target user is logged in may include the private terminal of the target user, or may include the public terminal. Therefore, the target terminal determined from the terminal devices on which the account of the target user is logged in may also include the private terminal of the target user and/or the public terminal. That is, the target terminal currently used by the target user may include only the private terminal of the target user, or may include only the public terminal, or may include both the private terminal of the user and the public terminal.

Therefore, in another embodiment of this application, when detecting that only the target user is currently using the target terminal, the server further obtains a device type of each target terminal. It should be noted that a specific implementation in which the server detects the device type of the target terminal is described in detail in the foregoing content, and details are not described herein again.

Based on this, in a possible implementation of this embodiment, when the server detects, based on the device type of each target terminal, that the target terminal includes the private terminal of the target user, S33 may specifically include the following step:

if it is detected, based on the identity information, that only the target user is currently using the target terminal, and it is detected that the target terminal includes the private terminal of the target user, controlling the private terminal to prompt the notification in the first prompt mode.

In this implementation, that the server detects that the target terminal includes the private terminal of the target user may include the following two cases: (1) The server detects that the target terminal includes only the private terminal of the target user. (2) The server detects that the target terminal includes the private terminal of the target user and the public terminal. In this implementation, when the target terminal includes the private terminal of the target user, the server preferentially controls the private terminal of the target user to prompt the notification for the target user in the first prompt mode, so that a risk of leaking privacy of the target user can be further reduced.

Figure 6:
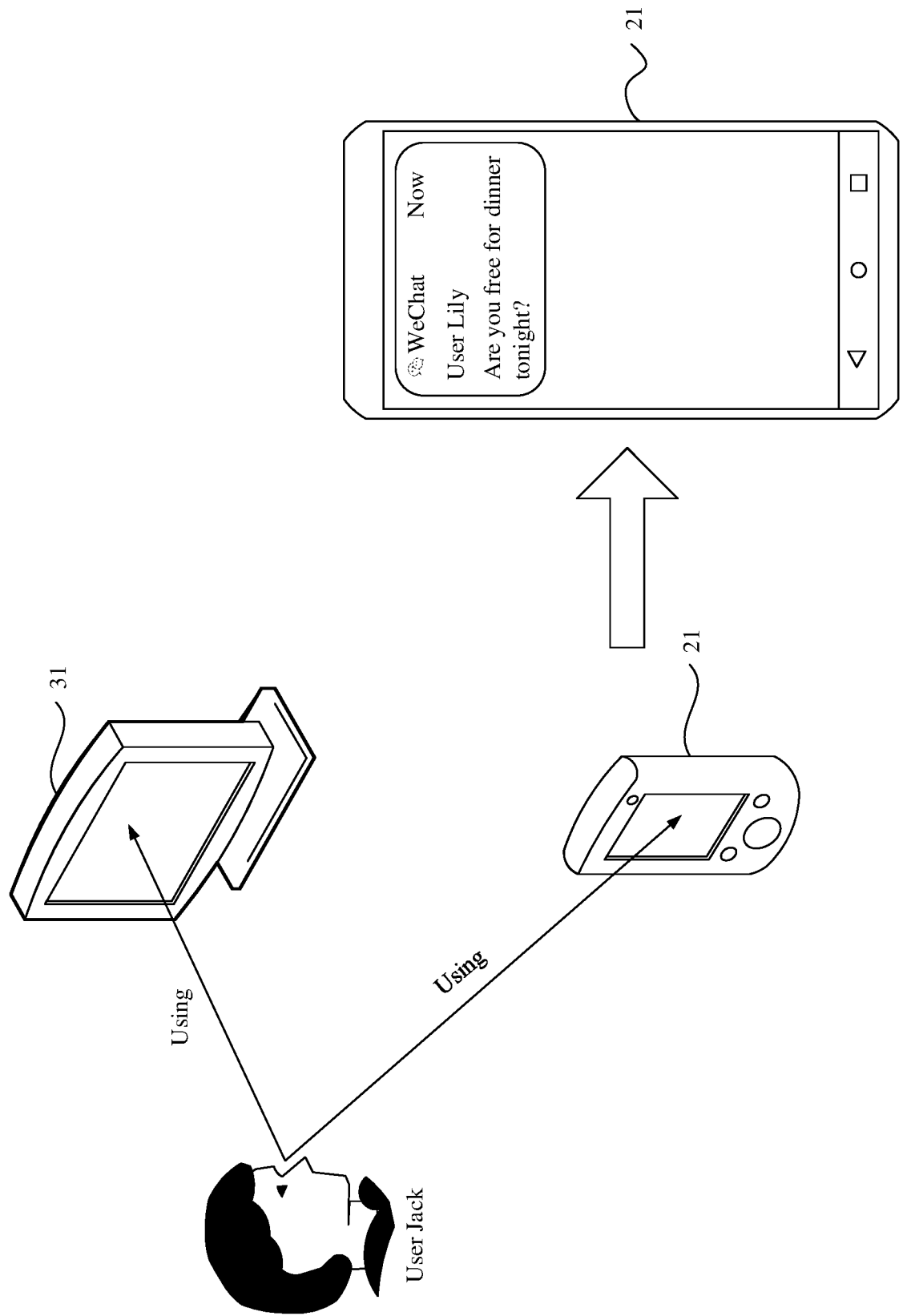
FIG. 6 is a schematic diagram of a specific scenario to which a notification prompt method is applicable according to another embodiment of this application.

For example, as shown in FIG. 6, when receiving a notification for the user Jack, if the server detects that an account of the user Jack is logged in on both the mobile phone 21 of the user Jack and a television 31, and the user Jack is currently using both the mobile phone 21 of the user Jack and the television 31, the server controls only the mobile phone 21 of the user Jack to prompt the notification for the user Jack in the first prompt mode.

Further, in a specific implementation of this embodiment, before controlling the private terminal of the target user to prompt the notification in the first prompt mode, the server may further detect an urgency attribute of the notification, determine a prompt occasion of the notification based on the urgency attribute of the notification, and control the private terminal of the target user to prompt the notification in the first prompt mode when the prompt occasion arrives.

The urgency attribute of the notification may include: urgent and non-urgent. When an urgency attribute of a notification is urgent, it indicates that the notification is an urgent notification, and the urgent notification is usually a notification that needs to be prompted in real time. When an urgency attribute of a notification is non-urgent, it indicates that the notification is a non-urgent notification, and the non-urgent notification is usually a notification that may not need to be prompted in real time.

In actual application, the user may define in advance a service that allows a notification to be prompted on a terminal device used by the user and an urgency attribute of a notification corresponding to each service. The service that allows a notification to be prompted on the terminal device may be a system service of the terminal device, for example, an incoming call service, an alarm clock service, and a low battery alarm service, or may be a service corresponding to an application installed on the terminal device, for example, a WeChat service. For example, the user may define urgency attributes of notifications corresponding to services such as the incoming call service, the alarm clock service, the low battery alert service, and an exception prompt service as urgent.

Specifically, when detecting the urgency attribute of the notification received by the server, the server may first determine a target service corresponding to the notification received by the server, and then determine, based on a predefined urgency attribute of a notification corresponding to each service, an urgency attribute of a notification corresponding to the target service. The server may determine the urgency attribute of the notification corresponding to the target service as the urgency attribute of the notification received by the server. For example, assuming that the notification received by the server is an incoming call notification, a target service corresponding to the incoming call notification is an incoming call service, and an urgency attribute that is of a notification corresponding to the incoming call service and that is predefined by the user is urgent, the server determines that an urgency attribute of the incoming call notification received by the server is urgent.

In actual application, prompt occasions of notifications with different urgency attributes may be predefined by the user. For example, in an embodiment, the user may predefine a prompt occasion of an urgent notification as a moment at which a terminal device receives a corresponding notification sent by the server, and a prompt occasion of a non-urgent notification as a moment at which a terminal device is in an idle state.

Based on this, when detecting that the notification for the target user is an urgent notification, the server determines that the prompt occasion of the notification is a moment at which the terminal device receives the notification sent by the server. Based on this, after receiving the notification for the target user from the server, the private terminal of the target user immediately prompts the notification for the target user in the first prompt mode. When receiving the urgent notification for the target user, the private terminal of the target user can prompt the urgent notification in time, so that the target user can learn of the received notification in time.

When detecting that the notification for the target user is a non-urgent notification, the server determines that the prompt occasion of the notification is a moment at which the terminal device is in the idle state. Based on this, after receiving the notification for the target user from the server, the private terminal of the target user prompts the notification for the target user in the first prompt mode when the private terminal is in the idle state. Specifically, if the private terminal of the target user is in the idle state at a moment of receiving the notification for the target user from the server, the private terminal of the target user immediately prompts the notification for the target user in the first prompt mode. If the private terminal of the target user is in a busy state at a moment of receiving the notification for the target user from the server, the private terminal of the target user prompts the notification for the target user in the first prompt mode only after the private terminal of the target user is changed from the busy state to the idle state.

That the terminal device is in the idle state may include but is not limited to the following cases: (1) The terminal device currently does not execute any immersive task. (2) A human-machine interaction frequency of the terminal device is less than or equal to a preset frequency threshold. The immersive task is a task that needs to be displayed in full screen during execution, for example, a game task or a full-screen video play task. The preset frequency threshold may be determined based on an actual situation, and is not limited herein.

That the terminal device is in a busy state may include but is not limited to the following cases: (1) The terminal device is currently executing an immersive task. (2) The terminal device performs screen casting. (3) The human-machine interaction frequency of the terminal device is greater than the preset frequency threshold.

In actual application, by way of example, and not limitation, the terminal device may detect a current working status of the terminal device based on a status of occupying the display by a task currently executed by the terminal device or a current human-machine interaction frequency of the terminal device. For example, when detecting that the terminal device is currently executing an immersive task and the currently executed task occupies the entire display of the terminal device, or when detecting that the current human-machine interaction frequency of the terminal device is greater than the preset frequency threshold, the terminal device considers that the terminal device is currently in the busy state. When detecting that the terminal device is not executing an immersive task and the current human-machine interaction frequency of the terminal device is low or equal to the preset frequency threshold, the terminal device considers that the terminal device is currently in the idle state.

For example, it is assumed that when the target user plays a game by using a mobile phone of the target user, the mobile phone receives a non-urgent notification. Because a human-machine interaction frequency of the mobile phone is high in this case, the mobile phone may consider that the mobile phone is currently in a busy state, and does not prompt the received notification. Because a human-machine interaction frequency of the mobile phone is low when the game ends, the mobile phone may consider that the mobile phone is currently in an idle state, and prompts the notification that the mobile phone has just received.

Figure 7:
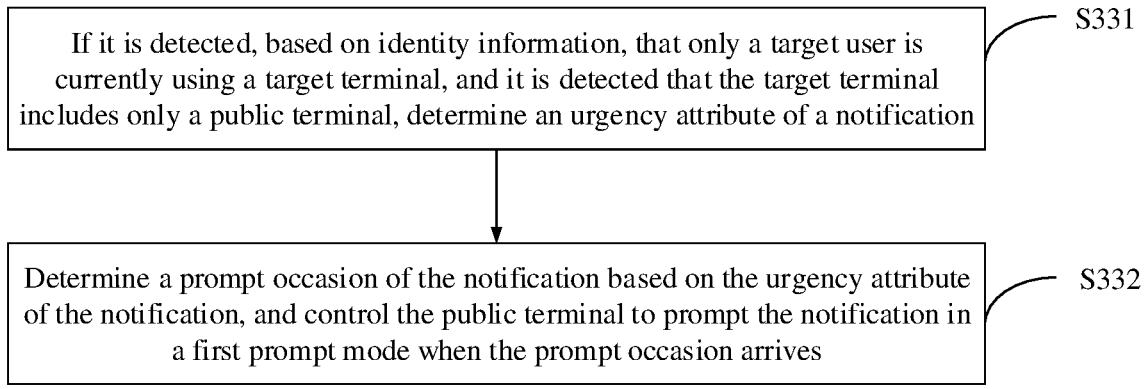
FIG. 7 is a specific schematic flowchart of S33 in a notification prompt method according to an embodiment of this application.

In another possible implementation of this embodiment, as shown in FIG. 7, when the server detects, based on the device type of each target terminal, that the target terminal includes only the public terminal, S33 may specifically further include S331 to S332. Details are as follows:

S331: If it is detected, based on the identity information, that only the target user is currently using the target terminal, and it is detected that the target terminal includes only the public terminal, determine an urgency attribute of the notification.

S332: Determine a prompt occasion of the notification based on the urgency attribute of the notification, and control the public terminal to prompt the notification in the first prompt mode when the prompt occasion arrives.

In this embodiment, when detecting that only the target user is currently using the target terminal, and the target terminal includes only the public terminal, the server may first determine a target service corresponding to the notification received by the server, and then determine, based on a predefined urgency attribute of a notification corresponding to each service, an urgency attribute of a notification corresponding to the target service. The server may determine the urgency attribute of the notification corresponding to the target service as the urgency attribute of the notification received by the server. For example, assuming that the notification received by the server is an incoming call notification, a target service corresponding to the incoming call notification is an incoming call service, and an urgency attribute that is of a notification corresponding to the incoming call service and that is predefined by the user is urgent, the server determines that an urgency attribute of the incoming call notification received by the server is urgent.

After determining the urgency attribute of the notification received by the server, the server may determine the prompt occasion of the notification based on the urgency attribute of the notification, and control the public terminal to prompt the notification in the first prompt mode when the prompt occasion of the notification arrives. Specifically, the server may send the notification for the target user received by the server, the prompt mode that is of the notification for the target user and that is determined by the server, and the prompt occasion for the notification on the terminal device to the public terminal at the same time. After receiving the foregoing information sent by the server, the public terminal prompts the notification for the target user in the first prompt mode when the prompt occasion of the notification for the target user arrives.

In actual application, prompt occasions of notifications with different urgency attributes may be predefined by a user.

Figure 8:
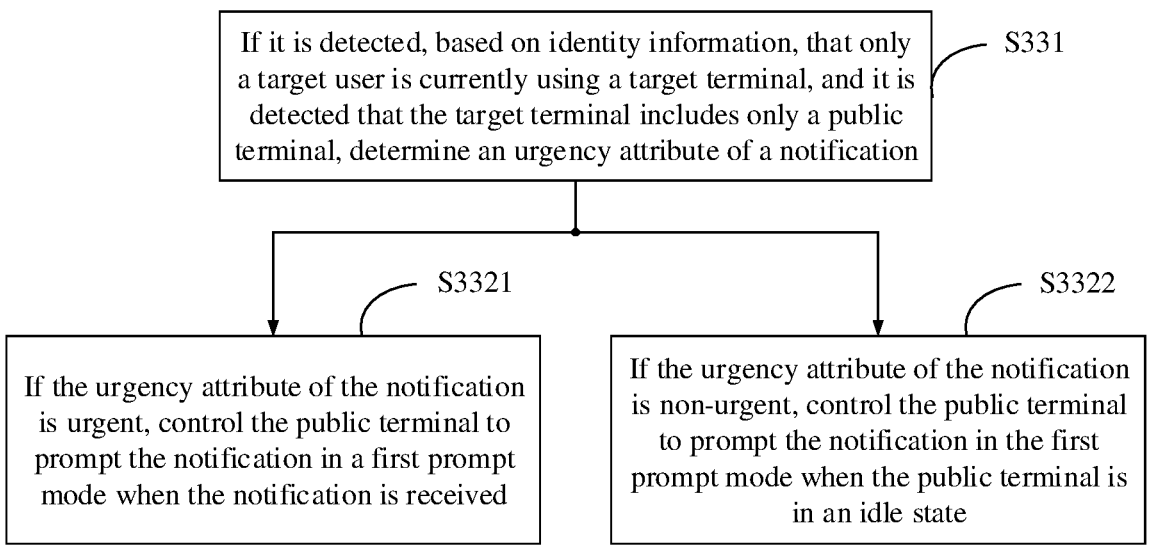
FIG. 8 is a specific schematic flowchart of S332 in a notification prompt method according to an embodiment of this application.

In a specific implementation, the user may predefine a prompt occasion of an urgent notification as a moment at which a terminal device receives a corresponding notification sent by the server, and a prompt occasion of a non-urgent notification as a moment at which a terminal device is in an idle state. Based on this, S332 may specifically include S3321 and S3322 shown in FIG. 8, and details are as follows:

S3321: If the urgency attribute of the notification is urgent, control the public terminal to prompt the notification in the first prompt mode when the notification is received.

In this implementation, when detecting that the notification for the target user is an urgent notification, the server determines that the prompt occasion of the notification is a moment at which the terminal device receives the notification sent by the server. After determining the prompt occasion of the notification for the target user, the server sends the notification for the target user and the prompt mode and the prompt occasion of the notification to the public terminal.

After receiving the notification for the target user from the server, the public terminal immediately prompts the notification for the target user in the first prompt mode.

In this embodiment, when receiving the urgent notification for the target user, the public terminal can prompt the urgent notification in time, so that the target user can learn of the received notification in time.

S3322: If the urgency attribute of the notification is non-urgent, control the public terminal to prompt the notification in the first prompt mode when the public terminal is in the idle state.

In this implementation, when detecting that the notification for the target user is a non-urgent notification, the server determines that the prompt occasion of the notification is a moment at which the terminal device is in the idle state. After determining the prompt occasion of the notification for the target user, the server sends the notification for the target user and the prompt mode and the prompt occasion of the notification to the public terminal.

After receiving the notification for the target user from the server, the public terminal prompts the notification for the target user in the first prompt mode when the public terminal is in the idle state. Specifically, if the public terminal is in the idle state at a moment of receiving the notification for the target user from the server, the public terminal immediately prompts the notification for the target user in the first prompt mode. If the public terminal is in the busy state at a moment of receiving the notification for the target user from the server, the public terminal prompts the notification for the target user in the first prompt mode only after the public terminal is changed from the busy state to the idle state. This avoids interface to the user.

Figure 9:
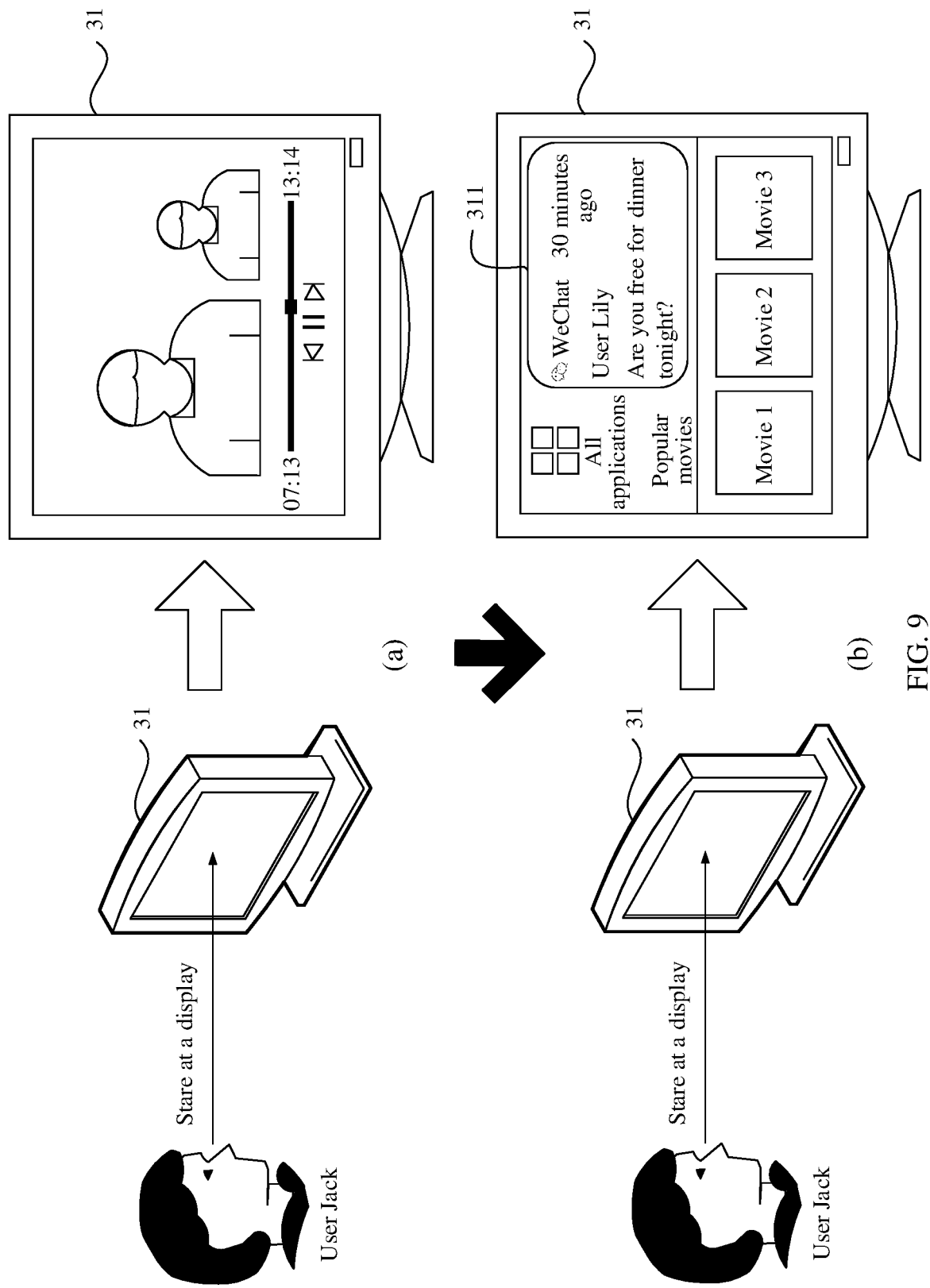
FIG. 9 is a schematic diagram of a specific scenario to which a notification prompt method is applicable according to another embodiment of this application.

For example, refer to FIG. 9. It is assumed that a television 31 is a public terminal of the target user Jack. When the television 31 receives a non-urgent notification for the user Jack from the server, as shown in (a) in FIG. 9, if the user Jack is currently watching a video by using the television, and the video is displayed in full screen, that is, if the television 31 is currently in the busy state, the television 31 does not prompt the notification for the user Jack. Further, as shown in (b) in FIG. 9, when the user Jack closes a video interface and the television 31 displays a program menu interface, because the television 31 currently is changed from the busy state to the idle state, the television 31 prompts the notification for the user Jack in this case. For example, the television 31 may prompt the notification for the user Jack by using a notification prompt box 311.

In another possible implementation of this embodiment, the user may alternatively define a prompt occasion of a non-urgent notification as a moment at which a terminal device is in the idle state and a status of using the terminal device by the user is "in use". The status of using the terminal device by the user is used to describe whether the user is staring at a display of the terminal device. Specifically, the state of using the terminal device by the user may include "in use" and "not in use". When the status of using the terminal device by the user is "in use", it indicates that the user is currently staring at the display of the terminal device. When the status of using the terminal device by the user is "not in use", it indicates that the user does not stare at the display of the terminal device. Based on this, S3322 may specifically include the following step:

if the urgency attribute of the notification is non-urgent, controlling the public terminal to prompt the notification in the first prompt mode when the public terminal is in the idle state and a status of using the public terminal by the target user is "in use".

In this implementation, when detecting that the notification for the target user is a non-urgent notification, the server determines that the prompt occasion of the notification is a moment at which the terminal device is in the idle state and the status of using the terminal device by the user is "in use". After determining the prompt occasion of the notification for the target user, the server sends the notification for the target user and the prompt mode and the prompt occasion of the notification to the public terminal. After receiving the notification for the target user from the server, the public terminal prompts the notification for the target user in the first prompt mode when the public terminal is in the idle state and the status of using the public terminal by the target user is "in use". The public terminal does not prompt the notification for the target user when the public terminal is in the busy state or the status of using the public terminal by the target user is "not in use".

Specifically, when receiving the notification for the target user from the server, the public terminal may detect a current working state of the public terminal, and detect a current status of using the public terminal by the target user. It should be noted that a manner in which the public terminal detects the working state of the public terminal is described in detail in the foregoing implementation. For details, refer to related descriptions in the foregoing implementation. Details are not described herein again. In actual application, by way of example, and not limitation, when detecting the status of using the public terminal by the target user, the public terminal may start a front-facing camera of the public terminal to obtain a facial image of the target user, and detect the status of using the public terminal by the target user by identifying an eye status of the target user in the facial image. Specifically, when detecting, based on the eye status of the target user in the facial image, that the target user does not stare at the display of the public terminal, the public terminal determines that the status of using the public terminal by the target user is "not in use". When detecting, based on the eye status of the target user in the facial image, that the target user is staring at the display of the public terminal, the public terminal determines that the status of using the public terminal by the target user is "in use".

More specifically, if the public terminal detects that the public terminal is currently in the idle state, and the status of using the public terminal by the target user is "in use", the public terminal immediately prompts the notification for the target user in the first prompt mode. If the public terminal detects that the public terminal is currently in the busy state, and the status of using the public terminal by the target user is "in use", the public terminal prompts the notification for the target user in the first prompt mode after the public terminal is changed from the busy state to the idle state. If the public terminal detects that the public terminal is currently in the idle state, but the status of using the public terminal by the target user is "not in use", the public terminal prompts the notification for the target user in the first prompt mode when the status of using the public terminal by the target user is changed from "not in use" to "in use".

For example, refer to FIG. 10(a) to FIG. 10(c). An account of the user Jack is logged in on the television 31 of the user Jack. As shown in FIG. 10(a), it is assumed that when the server receives a non-urgent notification for the user Jack and sends the urgent notification to the television 31 of the user Jack, the user Jack is selecting, by using the television 31, a television program that the user Jack wants to watch. A display interface of the television 31 displays a main menu interface in this case, and the user Jack is staring at a display of the television 31. That is, the television 31 is in the idle state and a status of using the television 31 by the user Jack is "in use" in this case. Therefore, the television 31 may prompt the notification for the user Jack in the first prompt mode in this case.

As shown in FIG. 10(b), it is assumed that when the server receives a non-urgent notification for the user Jack and sends the urgent notification to the television 31 of the user Jack, a display interface of the television 31 displays a main menu interface, but the user Jack in front of the television 31 does not stare at the display of the television 31. That is, although the television 31 is in the idle state, the status of using the television 31 by the user Jack is "not in use" in this case. Therefore, the television 31 does not prompt the notification for the user Jack in this case. As shown in FIG. 10(a), the television 31 prompts the notification for the user Jack only when the user Jack stares at the display of the television 31 again.

As shown in FIG. 10(*c*), it is assumed that when the server receives a non-urgent notification for the user Jack and sends the urgent notification to the television 31 of the user Jack, a display interface of the television 31 displays a main menu interface, but the user Jack in front of the television 31 just leaves (does not stare at the display of the television 31). That is, although the television 31 is in the idle state, the status of using the television 31 by the user Jack is "not in use" in this case. Therefore, the television 31 does not prompt the notification for the user Jack in this case. As shown in FIG. 10(*a*), the television 31 prompts the notification for the user Jack only when the user Jack returns to the front of the television 31 and stares at the display of the television 31.

In still another possible implementation of this embodiment, when detecting that the public terminal is currently in the idle state but the status of using the public terminal by the target user is "not in use", the public terminal may alternatively prompt the notification for the target user in a notification prompt mode combining the first prompt mode and a ringtone mode and/or a voice broadcast mode. Specifically, when a user currently using the public terminal includes only the target user, the public terminal may broadcast specific content of the notification when prompting the target user in the voice broadcast manner.

Figure 11:
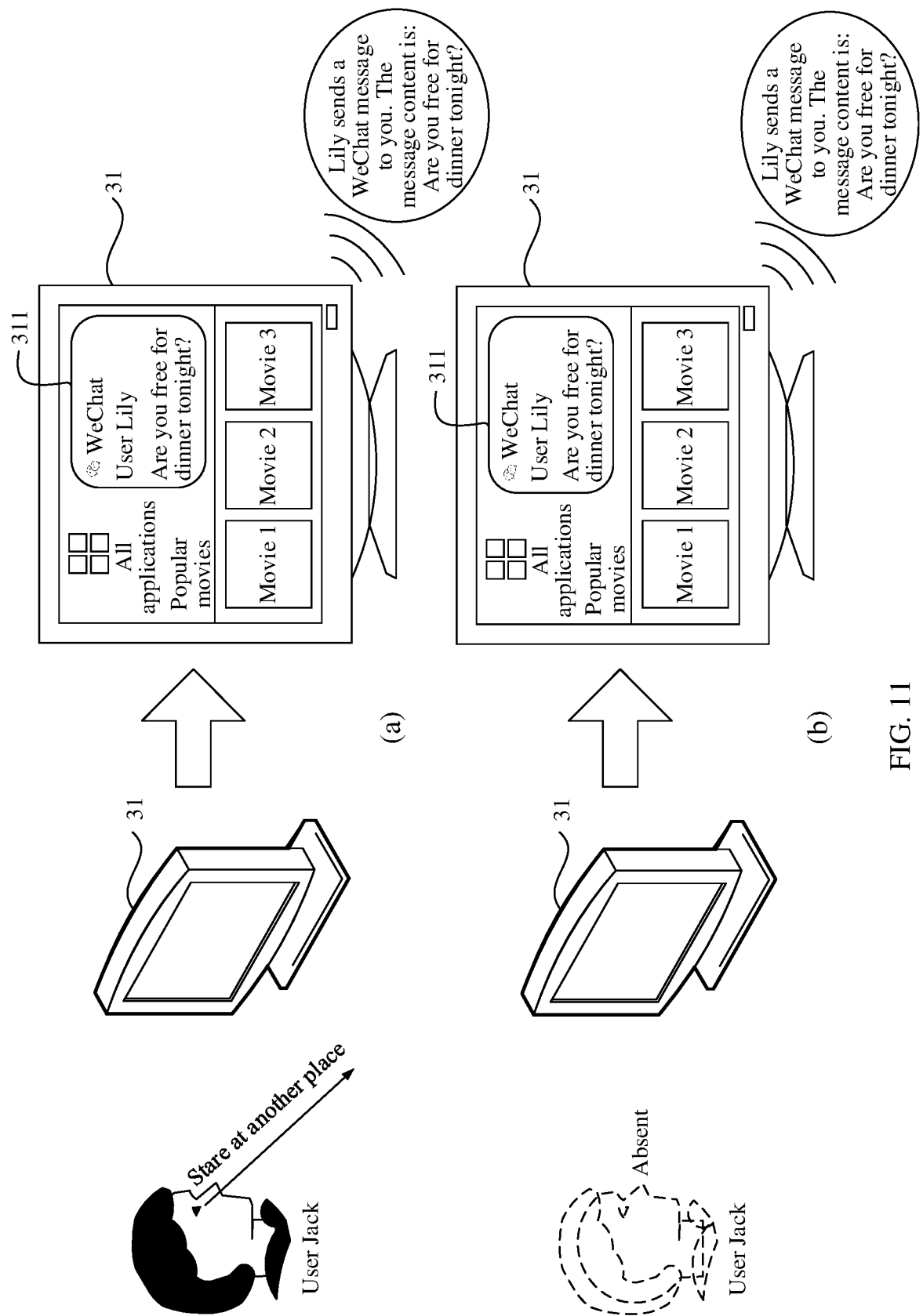
FIG. 11 is a schematic diagram of a specific scenario to which a notification prompt method is applicable according to another embodiment of this application.

For example, refer to FIG. 11. It is assumed that when the server receives a non-urgent notification for the user Jack and sends the urgent notification to the television 31 of the user Jack, a display interface of the television 31 displays a main menu interface, but the user Jack does not stare at the display of the television 31 (for example, in (a) in FIG. 11, the user Jack is in front of the television 31 but does not stare at the display of the television 31 in this case, or in (b) in FIG. 11, the user Jack is not in front of the television 31 in this case). That is, although the television 31 is in the idle state, the status of using the television 31 by the user Jack is "not in use" in this case. Therefore, in this case, the television 31 may display the notification in a form of a notification prompt box 311, and at the same time, the television 31 may further prompt, in the voice broadcast manner, the user Jack that Jack receives a notification, and broadcast specific content of the notification.

In still another embodiment of this application, after S62, the notification prompt method may further include the following steps:

if it is detected that a new terminal device in the terminal devices on which the account of the target user is logged in currently meets the preset notification prompt condition, the new terminal device includes a private terminal of the target user, and a user currently using the private terminal is the target user, controlling the public terminal to cancel the prompt of the notification, and controlling the private terminal to prompt the notification in the first prompt mode.

In this embodiment, after controlling the only public terminal included in the target terminal to prompt the notification for the target user in the first prompt mode, the server may further detect in real time whether a new terminal device meets the preset notification prompt condition in the terminal devices on which the account of the target user is logged in. The new terminal device may be any terminal device other than the target terminal in the terminal devices on which the account of the target user is logged in.

For example, it is assumed that terminal devices on which the account of the target user Jack is logged in include a mobile phone, a tablet computer, and a television of the user Jack, the mobile phone is a private terminal of the user Jack, and the tablet computer and the computer are public terminals of the user Jack. If the target terminal that meets the preset notification prompt condition and that is determined by the server in S31 includes only the television of the user Jack, the new terminal device that meets the preset notification prompt condition and that is detected by the server in this embodiment may include the mobile phone and/or the tablet computer of the user Jack.

The server further detects a device type of the new terminal device when detecting that the new terminal device meets the preset notification prompt condition in the terminal devices on which the account of the target user is logged in. When detecting that the new terminal device includes a private terminal of the target user, the server obtains identity information of a user currently using the private terminal, and detects, based on the identity information of the user currently using the private terminal, a quantity and identities of users currently using the private terminal.

It should be noted that, in a specific implementation of this embodiment, a manner in which the server obtains the identity information of the user currently using the private terminal may be the same as the manner in which the server obtains the identity information of the user using the target terminal in S32. For details, refer to related descriptions in S32. Details are not described herein again. In another specific implementation of this embodiment, if the server detects that a new terminal device meets the preset notification prompt condition, and the new terminal device has obtained identity information entered by a user, for example, fingerprint information of the user, the new terminal device may send the fingerprint information of the user to the server, and the server may detect, based on the fingerprint information of the user, an identity of the user currently using the new terminal device.

In this embodiment, when detecting that the user currently using the private terminal includes only the target user, the server may send a notification hiding instruction to the only public terminal included in the target terminal determined by the server in S31. The notification hiding instruction is used to instruct the public terminal to cancel the prompt of the notification for the target user. At the same time, the server further sends the notification for the target user and a prompt mode of the notification to the private terminal determined by the server in this embodiment, to control the private terminal to prompt the notification for the target user in the first prompt mode.

Figure 12A:
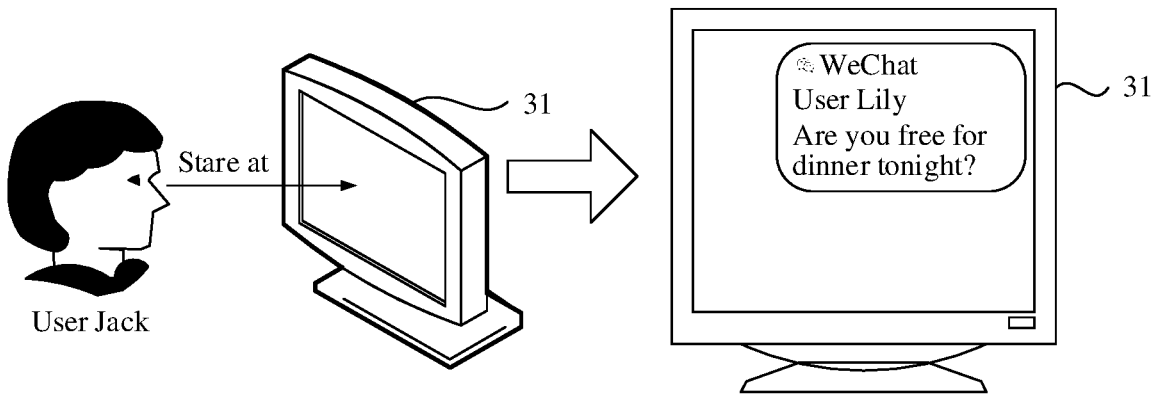
FIG. 12(a) to FIG. 12(c) are a schematic diagram of a specific scenario to which a notification prompt method is applicable according to another embodiment of this application.
Figure 12B:
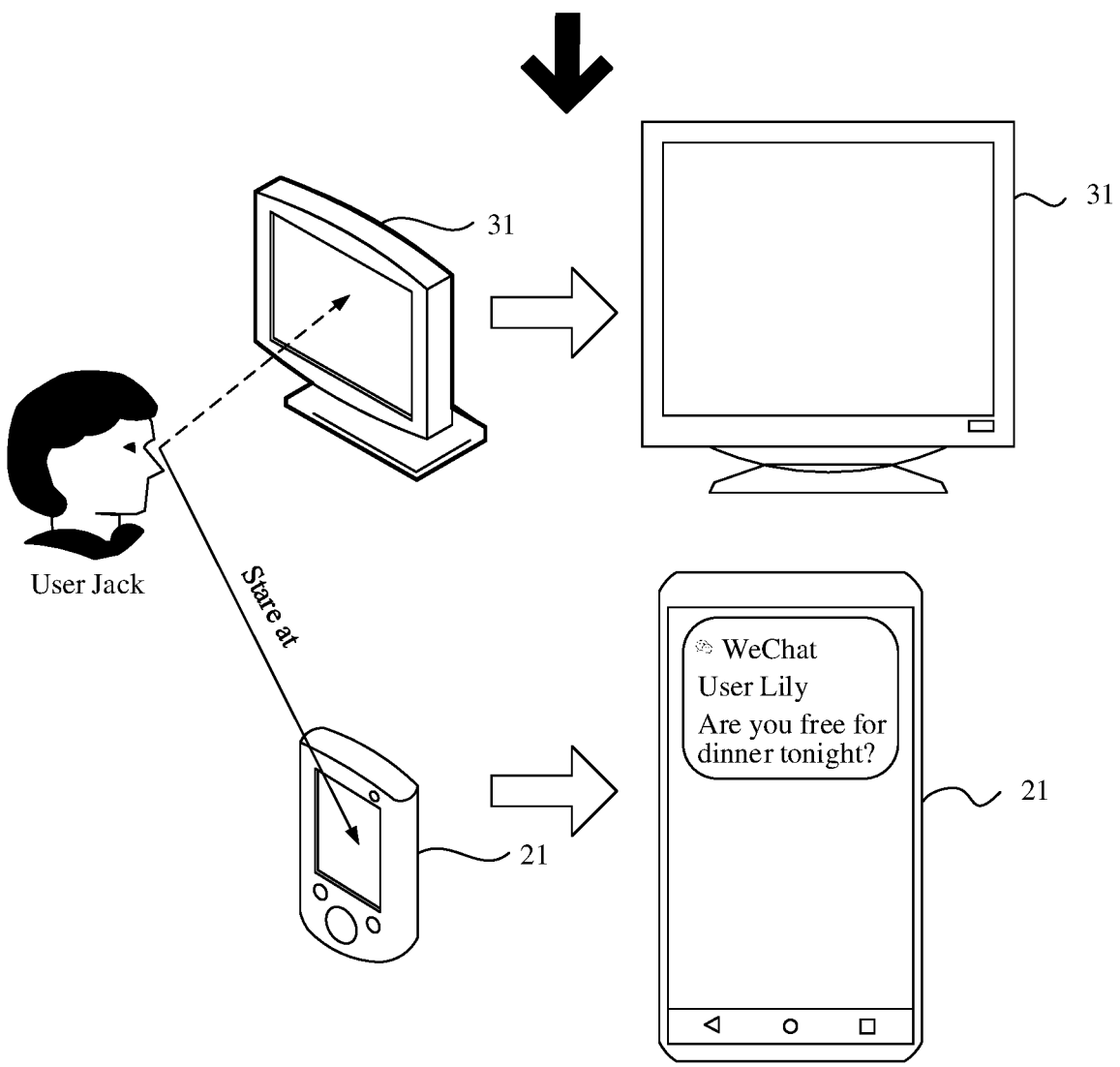
Figure 12C:
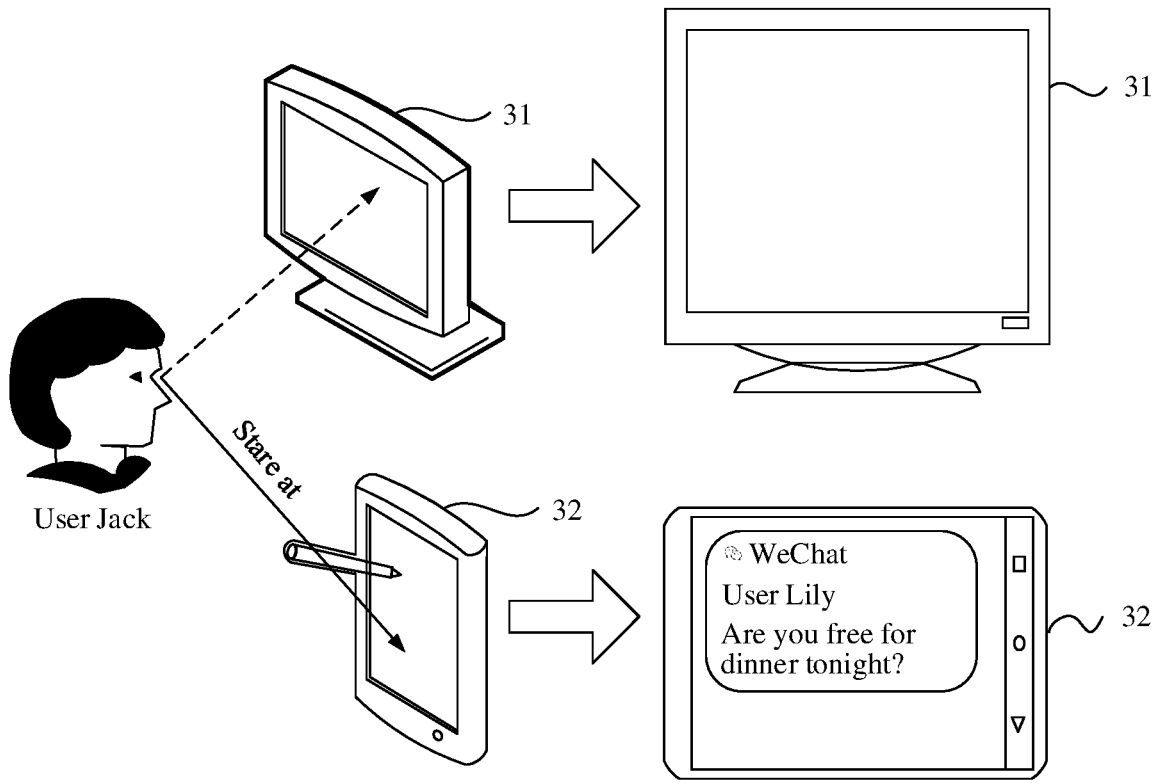

For example, refer to FIG. 12(*a*) to FIG. 12(*c*). In FIG. 12(*a*), if the server detects, when receiving the notification for the target user Jack, that the target terminal includes only the television 31 of the user Jack, and only the user Jack is currently using the television 31, the server controls the television 31 of the user Jack to prompt the notification for the user Jack in the first prompt mode. In FIG. 12(*b*), if the server controls the television 31 to prompt the notification for the user Jack, and then detects that the mobile phone 21 on which the account of the user Jack is logged in is currently used by the user Jack, for example, is currently picked up by the user Jack, the server controls the television 31 of the user Jack to cancel the prompt of the notification for the user Jack, and controls the mobile phone 21 of the user Jack to prompt the notification for the user Jack in the first prompt mode.

In a possible implementation of this embodiment, when detecting that the new terminal device includes only a public terminal and a user currently using the public terminal is the target user, the server determines a value relationship between a first distance between the public terminal and the target user and a second distance between the only public terminal included in the target terminal and the target user. By way of example, and not limitation, the server may control the only public terminal included in the new terminal device to collect a first facial image by using a front-facing camera of the public terminal, and control the only public terminal included in the target terminal to collect a second facial image by using a front-facing camera of the public terminal. A size of the first facial image is the same as a size of the second facial image. After obtaining the first facial image and the second facial image, the server determines a first proportion of a face included in the first facial image to the first facial image, determines a second proportion of a face included in the second image to the second facial image, and determines the value relationship between the first distance and the second distance by using a value relationship between the first proportion and the second proportion. Specifically, if it is detected that the first proportion is less than the second proportion, the server determines that the first distance is less than the second distance. If it is detected that the first proportion is greater than the second proportion, the server determines that the first distance is greater than the second distance.

When the server detects that the first distance is less than the second distance, it indicates that the only public terminal included in the new terminal device is closer to the target user, and the only public terminal included in the target terminal is farther from the target user. In this case, the server may send a notification hiding instruction to the only public terminal included in the target terminal. The notification hiding instruction is used to instruct the only public terminal included in the target terminal to cancel the prompt of the notification for the target user. The server further sends the notification for the target user and the prompt mode of the notification to the only public terminal included in the new terminal device, to control the only public terminal included in the new terminal device to prompt the notification for the target user in the first prompt mode.

For example, still refer to FIG. 12(*a*) to FIG. 12(*c*). In FIG. 12(*a*), if the server detects, when receiving the notification for the target user Jack, that the target terminal includes only the television 31 of the user Jack, and only the user Jack is currently using the television 31, the server controls the television 31 of the user Jack to prompt the notification for the user Jack in the first prompt mode. In FIG. 12(*c*), if the server detects that a tablet computer 32 on which the account of the user Jack is logged in is currently used by the user Jack, for example, is currently picked up by the user Jack, and detects that a first distance between the tablet computer 32 and the user Jack is less than a second distance between the television 31 and the user Jack, the server controls the television 31 of the user Jack to cancel the prompt of the notification for the user Jack, and controls the tablet computer 32 of the user Jack to prompt the notification for the user Jack in the first prompt mode.

S34: If it is detected, based on the identity information, that a plurality of users are currently using the target terminal, control the target terminal to prompt the notification in the second prompt mode, where the preview content of the notification is not displayed in the second prompt mode.

In a possible implementation of this embodiment, when detecting that a plurality of users are currently using the target terminal, the server may not detect specific identities of the plurality of users, and directly determine that a prompt mode of the notification on the target terminal is the second prompt mode. In another possible implementation of this embodiment, only when detecting that a plurality of users are currently using the target terminal and the plurality of users include the target user, the server determines that a prompt mode of the notification on the target terminal is the second prompt mode. When the plurality of users do not include the target user, the server may not control the target terminal to prompt the notification. The preview content of the notification is not displayed in the second prompt mode.

In this embodiment, the server may send, to the target terminal, the notification for the target user received by the server and the prompt mode that is of the notification on the target terminal and that is determined by the server. Because the prompt mode that is of the notification on the target terminal and that is determined by the server is the second prompt mode in this embodiment, after receiving the notification for the target user from the server, the target terminal prompts the notification for the target user in the second prompt mode.

In actual application, when prompting the notification for the target user in the second prompt mode, the target terminal may also prompt the notification for the target user by using a notification prompt box. Specifically, in an implementation, the target terminal may display a quantity of received notifications, a type of a notification, and a source of a notification in the notification prompt box, but does not display specific content of a notification. In another implementation, to further improve confidentiality of user privacy, the target terminal may display only a quantity of received notifications in the notification prompt box. Further, because the plurality of users are using the target terminal in this embodiment, the target terminal may further display, in the notification prompt box, the target user for which the notification is intended, and the plurality of users currently using the target terminal learn of a user for which the notification prompted by the target terminal is intended. By way of example, and not limitation, the target terminal may display the notification prompt box in an area that is on the display and that is close to a top border of the display.

Figure 13:
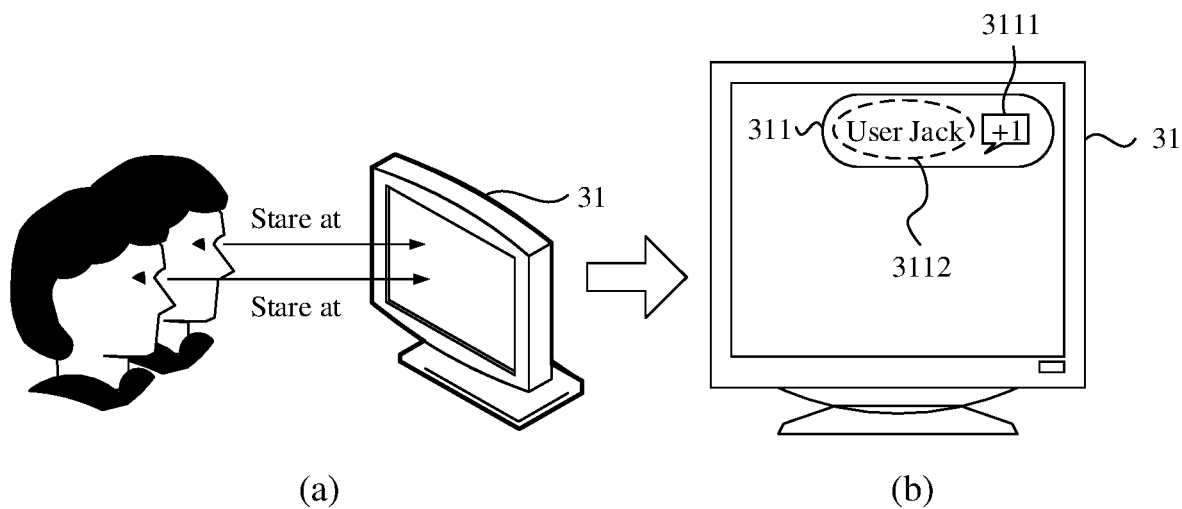
FIG. 13 is a schematic diagram of a specific scenario of a notification prompt method when a plurality of users are currently using a target terminal according to an embodiment of this application.

For example, FIG. 13 is a schematic diagram of a specific scenario of a notification prompt method when a plurality of users are currently using the target terminal according to this embodiment. In this scenario, it is assumed that a notification received by the server is a WeChat notification for the target user Jack, the WeChat notification is from the user Lily, and specific content of the notification is "Are you free for dinner tonight?". As shown in (a) in FIG. 13, assuming that the target terminal includes a television 31 of the user Jack, and a plurality of users are using the target terminal, as shown in (b) in FIG. 13, the television 31 of the user Jack may display, in the notification prompt box 311, only a quantity 3111 of received notifications and a target user 3112 for which the notifications are intended.

In this embodiment, when receiving the notification for the target user, the server first determines the target terminal that meets the preset notification prompt condition from the terminal devices on which the account of the target user is logged in, and then detects, based on the identity information of the user currently using the target terminal, a quantity and identities of users currently using the target terminal. When detecting that only the target user is currently using the target terminal, the server controls the target terminal to prompt the notification for the target user in a prompt mode of displaying preview content of the notification. When detecting that a plurality of users are currently using the target terminal, the server controls the target terminal to prompt the notification for the target user in a prompt mode in which preview content of the notification is not displayed. That is, the server can intelligently adjust a notification prompt mode of the target terminal based on the quantity and identities of the users currently using the target terminal. Compared with the conventional technology, according to the notification prompt method provided in embodiments of this application, a user does not need to set a notification prompt mode on a terminal device, and intelligence of user privacy protection can be improved while user privacy is protected.

In actual application, the terminal devices on which the account of the target user is logged in may include the private terminal of the target user, or may include the public terminal. Therefore, the target terminal determined from the terminal devices on which the account of the target user is logged in may also include the private terminal of the target user and/or the public terminal. That is, the target terminal currently used by the target user may include only the private terminal of the target user, or may include only the public terminal, or may include both the private terminal of the user and the public terminal.

Therefore, in another embodiment of this application, when detecting that the plurality of users are currently using the target terminal, the server further obtains a device type of each target terminal. It should be noted that a specific implementation in which the server detects the device type of the target terminal is described in detail in the foregoing content, and details are not described herein again.

Based on this, in a possible implementation of this embodiment, when the server detects, based on the device type of each target terminal, that the target terminal includes the private terminal of the target user, S34 may specifically include the following step:

if it is detected, based on the identity information, that the plurality of users are currently using the target terminal, and it is detected that the target terminal includes a private terminal of the target user, when a plurality of users are currently using the private terminal, and the notification relates to privacy of the target user, controlling the private terminal to prompt the notification in the second prompt mode.

In this implementation, that the server detects that the target terminal includes the private terminal of the target user may include the following two cases: (1) The server detects that the target terminal includes only the private terminal of the target user. (2) The server detects that the target terminal includes the private terminal of the target user and the public terminal. In this implementation, when the target terminal includes the private terminal of the target user, the server preferentially controls the private terminal of the target user to prompt the notification for the target user, so that a risk of leaking privacy of the target user can be further reduced.

In this implementation, after detecting that the target terminal includes the private terminal of the target user, the server further detects a quantity and identities of users currently using the private terminal, and detects whether the notification for the target user relates to the privacy of the target user. Specifically, when the server detects that the plurality of users are currently using the private terminal, and the notification for the target user relates to the privacy of the target user, to prevent disclosure of the privacy of the target user, the server may control the private terminal to prompt the notification for the target user in the second prompt mode.

It may be understood that, directionality of a notification received by the private terminal is usually clear. That is, the received notification is for the target user by default. Therefore, in a specific implementation, when prompting the notification for the target user in the second prompt mode, the private terminal of the target user may display only a quantity of received notifications.

Figure 14:
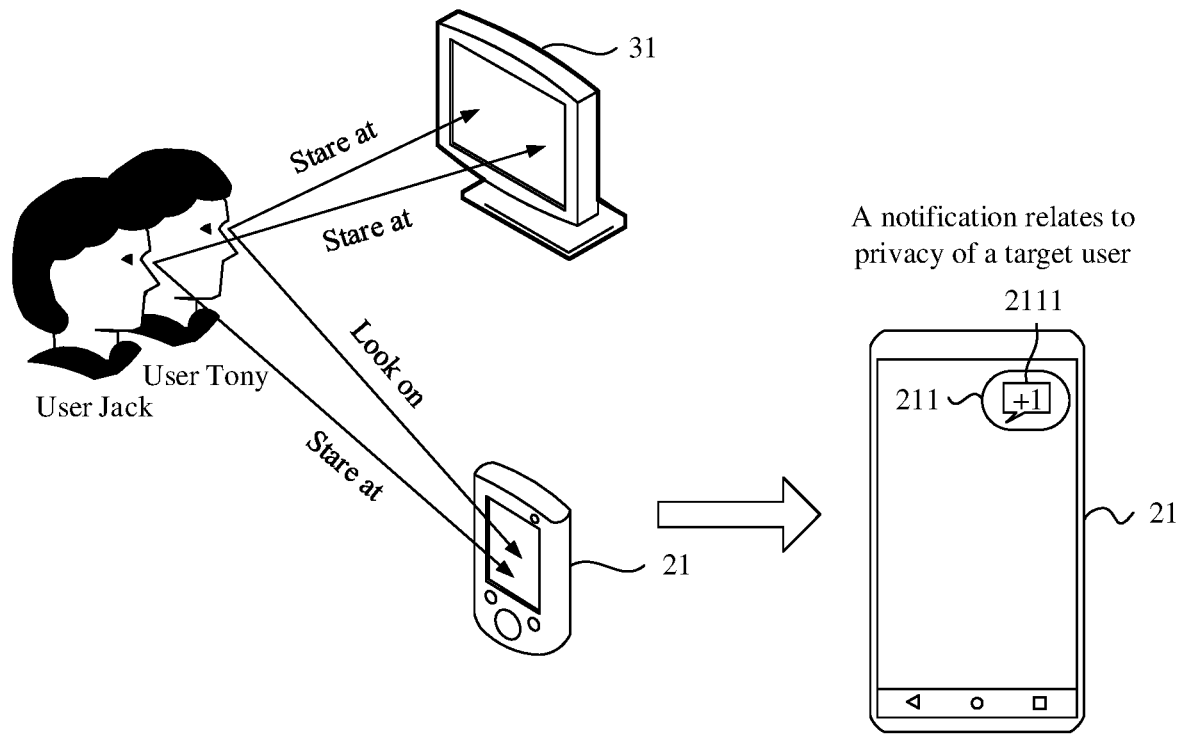
FIG. 14 is a schematic diagram of a specific scenario to which a notification prompt method is applicable according to another embodiment of this application.

For example, as shown in FIG. 14, when the server receives a notification for the user Jack, if the server detects that an account of the user Jack is logged in on both the mobile phone 21 of the user Jack and the television 31, and detects that both the user Jack and a user Tony are currently staring at the television 31, the user Jack is also sending a message by using the mobile phone 21 of the user Jack, and the user Tony is looking on the mobile phone 21 of the user Jack, when the server detects that the notification for the target user Jack relates to privacy of the user Jack, the server controls only the mobile phone 21 of the user Jack to prompt the notification for the user Jack in the second prompt mode. The mobile phone 21 of the user Jack may display only a quantity 2111 of received notifications in a notification prompt box 211.

In still another embodiment of this application, after S32, the notification prompt method may further include the following step:

if it is detected, based on the identity information, that the plurality of users are currently using the target terminal, and it is detected that the target terminal includes a private terminal of the target user, when a plurality of users currently using the private terminal include the target user, and the notification does not relate to privacy of the target user, controlling the private terminal to prompt the notification in the first prompt mode.

In this embodiment, after detecting that the target terminal includes the private terminal of the target user, the server further detects a quantity and identities of the users currently using the private terminal, and detects whether the notification for the target user relates to the privacy of the target user. Specifically, when the server detects that the plurality of users are currently using the private terminal, the plurality of users include the target user, and the notification for the target user does not relate to the privacy of the target user, the server may control the private terminal to prompt the notification for the target user in the first prompt mode.

Figure 15:
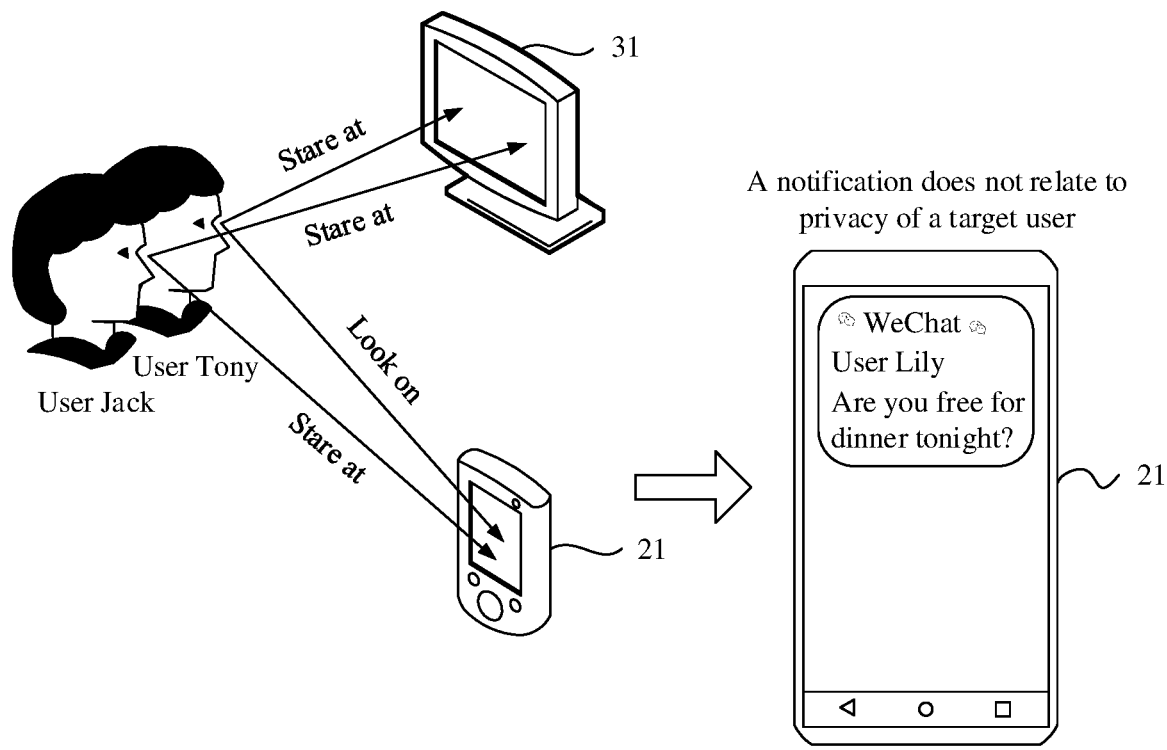
FIG. 15 is a schematic diagram of a specific scenario to which a notification prompt method is applicable according to another embodiment of this application.

For example, as shown in FIG. 15, when the server receives a notification for the user Jack, if the server detects that an account of the user Jack is logged in on both the mobile phone 21 of the user Jack and the television 31, and detects that both the user Jack and a user Tony are currently staring at the television 31, the user Jack is also sending a message by using the mobile phone 21 of the user Jack, and the user Tony is looking on the mobile phone 21 of the user Jack, when the server detects that the notification for the target user Jack does not relate to privacy of the user Jack, the server controls only the mobile phone 21 of the user Jack to prompt the notification for the user Jack in the first prompt mode.

In still another embodiment of this application, after S32, the notification prompt method may further include the following step:

if it is detected, based on the identity information, that the plurality of users are currently using the target terminal, and it is detected that the target terminal includes a private terminal of the target user, when a user currently using the private terminal includes only the target user, controlling the private terminal to prompt the notification in the first prompt mode.

In this embodiment, after detecting that the target terminal includes the private terminal of the target user, the server further detects a quantity and identities of the users currently using the private terminal, and detects whether the notification for the target user relates to the privacy of the target user. Specifically, when the server detects that the target terminal includes only the private terminal, regardless of whether the notification for the target user relates to the privacy of the target user, the server may control the private terminal to prompt the notification for the target user in the first prompt mode.

For example, as shown in FIG. 16, when the server receives a notification for the user Jack, if the server detects that an account of the user Jack is logged in on both the mobile phone 21 of the user Jack and the television 31, and detects that both the user Jack and a user Tony are currently staring at the television 31, the user Jack is also sending a message by using the mobile phone 21 of the user Jack, and the user Tony is not looking on the mobile phone 21 of the user Jack, the server may control only the mobile phone 21 of the user Jack to prompt the notification for the user Jack in the first prompt mode.

In another possible implementation of this embodiment, as shown in FIG. 17, when the server detects, based on the device type of each target terminal, that the target terminal includes only the public terminal, S34 may specifically further include S341 to S342. Details are as follows:

S341: If it is detected, based on the identity information, that the plurality of users currently using the target terminal include the target user, and it is detected that the target terminal includes only a public terminal, determine an urgency attribute of the notification.

S342: Determine a prompt occasion of the notification based on the urgency attribute of the notification, and when it is detected that the notification relates to privacy of the target user, control the public terminal to prompt the notification in the second prompt mode when the prompt occasion arrives.

In this implementation, the urgency attribute of the notification may include: urgent and non-urgent. When an urgency attribute of a notification is urgent, it indicates that the notification is an urgent notification, and the urgent notification is usually a notification that needs to be prompted in real time. When an urgency attribute of a notification is non-urgent, it indicates that the notification is a non-urgent notification, and the non-urgent notification is usually a notification that does not need to be prompted in real time.

In actual application, the user may define in advance a service that allows a notification to be prompted on a terminal device used by the user and an urgency attribute of a notification corresponding to each service. The service that allows a notification to be prompted on the terminal device may be a system service of the terminal device, for example, an incoming call service, an alarm clock service, and a low battery alarm service, or may be a service corresponding to an application installed on the terminal device, for example, a WeChat service. For example, the user may define urgency attributes of notifications corresponding to services such as the incoming call service, the alarm clock service, the low battery alert service, and an exception prompt service as urgent.

Based on this, when detecting that the plurality of users are currently using the target terminal, and the target terminal includes only the public terminal, the server may first determine a target service corresponding to the notification received by the server, and then determine, based on a predefined urgency attribute of a notification corresponding to each service, an urgency attribute of a notification corresponding to the target service. The server may determine the urgency attribute of the notification corresponding to the target service as the urgency attribute of the notification received by the server. For example, assuming that the notification received by the server is an incoming call notification, a target service corresponding to the incoming call notification is an incoming call service, and an urgency attribute that is of a notification corresponding to the incoming call service and that is predefined by the user is urgent, the server determines that an urgency attribute of the incoming call notification received by the server is urgent.

After determining the urgency attribute of the notification received by the server, the server may determine the prompt occasion of the notification based on the urgency attribute of the notification. After determining the prompt occasion of the notification received by the server, the server further detects whether the notification relates to the privacy of the target user. When detecting that the notification relates to the privacy of the target user, the server controls the public terminal to prompt the notification in the second prompt mode when the prompt occasion of the notification arrives. Specifically, the server may send the notification for the target user received by the server, the prompt mode that is of the notification for the target user and that is determined by the server, and the prompt occasion for the notification on the terminal device to the public terminal at the same time. After receiving the foregoing information sent by the server, the public terminal prompts the notification for the target user in the second prompt mode when the prompt occasion of the notification for the target user arrives.

In actual application, prompt occasions of notifications with different urgency attributes may be predefined by a user.

Figure 18:
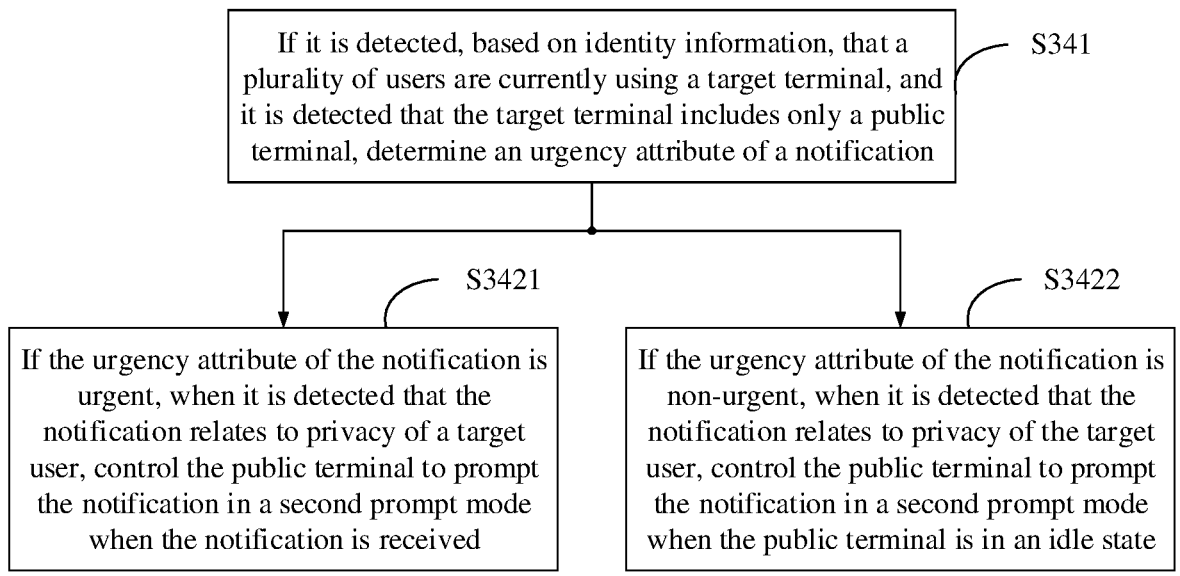
FIG. 18 is a specific schematic flowchart of S342 in a notification prompt method according to an embodiment of this application.

In a specific implementation, the user may predefine a prompt occasion of an urgent notification as a moment at which a terminal device receives a corresponding notification sent by the server, and a prompt occasion of a non-urgent notification as a moment at which a terminal device is in an idle state. Based on this, S342 may specifically include S3421 and S3422 shown in FIG. 18, and details are as follows.

S3421: If the urgency attribute of the notification is urgent, when it is detected that the notification relates to the privacy of the target user, control the public terminal to prompt the notification in the second prompt mode when the notification is received.

In this implementation, when detecting that the notification for the target user is an urgent notification, the server determines that the prompt occasion of the notification is a moment at which the terminal device receives the notification sent by the server. After determining the prompt occasion of the notification for the target user, the server sends the notification for the target user and the prompt mode and the prompt occasion of the notification to the public terminal.

After receiving the notification for the target user from the server, the public terminal immediately prompts the notification for the target user in the second prompt mode.

In this embodiment, when receiving the urgent notification for the target user, the public terminal can prompt the urgent notification in time, so that the target user can learn of the received notification in time.

S3422: If the urgency attribute of the notification is non-urgent, when it is detected that the notification relates to the privacy of the target user, control the public terminal to prompt the notification in the second prompt mode when the public terminal is in an idle state.

In this implementation, when detecting that the notification for the target user is a non-urgent notification, the server determines that the prompt occasion of the notification is a moment at which the terminal device is in the idle state. After determining the prompt occasion of the notification for the target user, the server further detects whether the notification for the target user relates to the privacy of the target user. When detecting that the notification for the target user relates to the privacy of the target user, the server determines that the prompt mode of the notification on the terminal device is the second prompt mode. After determining the prompt occasion and the prompt mode of the notification for the target user, the server sends the notification for the target user and the prompt mode and the prompt occasion of the notification to the public terminal.

After receiving the notification for the target user from the server, the public terminal prompts the notification for the target user in the second prompt mode when the public terminal is in the idle state. Specifically, if the public terminal is in the idle state at a moment of receiving the notification for the target user from the server, the public terminal immediately prompts the notification for the target user in the second prompt mode. If the public terminal is in the busy state at a moment of receiving the notification for the target user from the server, the public terminal prompts the notification for the target user in the second prompt mode only after the public terminal is changed from the busy state to the idle state.

Figure 19:
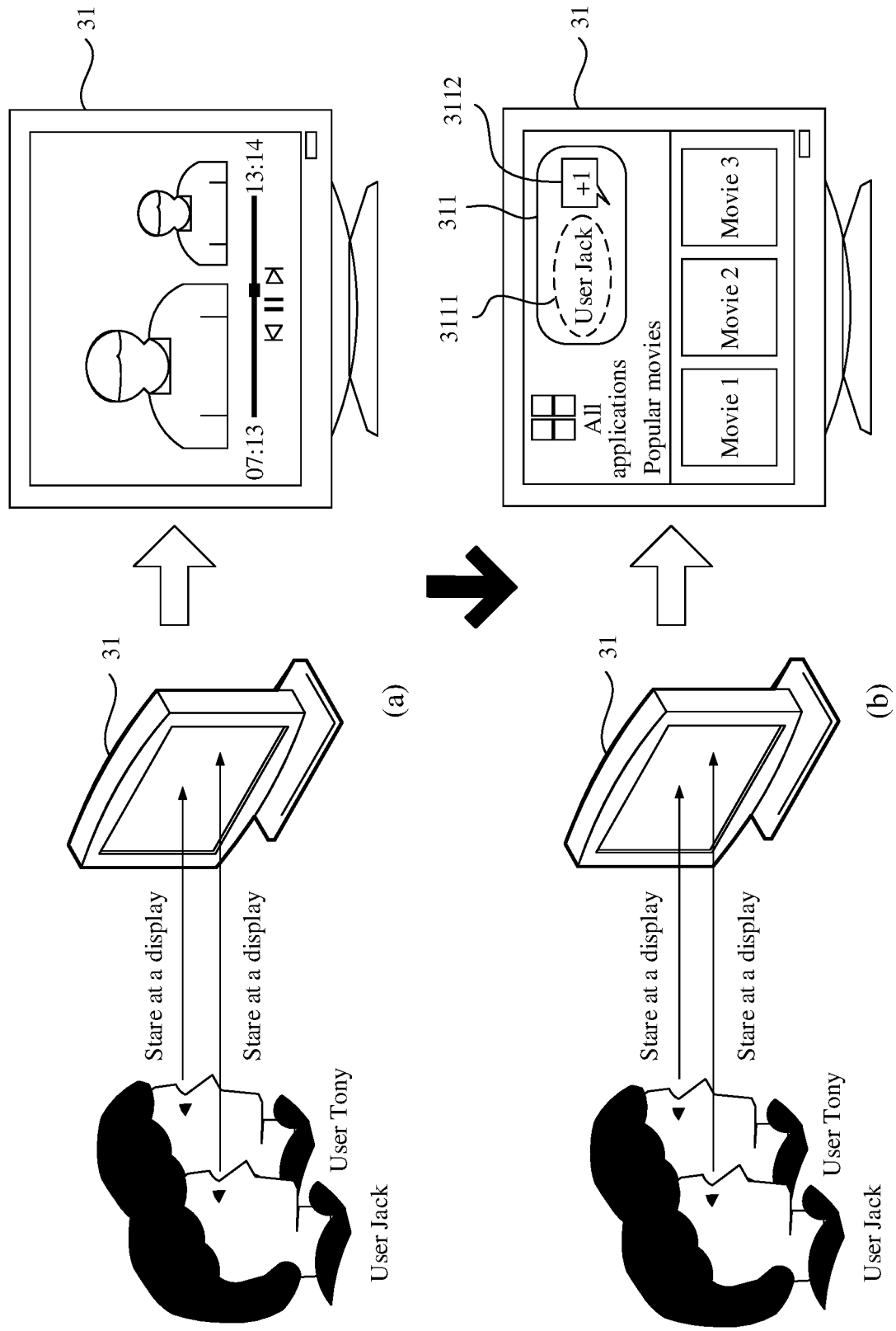
FIG. 19 is a schematic diagram of a specific scenario to which a notification prompt method is applicable according to another embodiment of this application.

For example, refer to FIG. 19. It is assumed that the television 31 is a public terminal of the target user Jack. When the television 31 receives a non-urgent notification for the user Jack from the server, as shown in (a) in FIG. 19, if the user Jack and the user Tony are currently watching a video by using the television, that is, if the television 31 is currently in the busy state, the television 31 does not prompt the notification for the user Jack. Further, as shown in (b) in FIG. 19, when the user Jack or the user Tony closes a video interface and the television 31 displays a program menu interface, because the television 31 is currently changed from the busy state to the idle state, the television 31 prompts the notification for the user Jack in this case. Further, because the notification for the user Jack relates to privacy of the user Jack, the television 31 prompts the notification for the user Jack in the second prompt mode. For example, the television 31 may prompt the notification for the user Jack by using a notification prompt box 311. Specifically, the television 31 may display a target user 3111 for which the notification is intended and a quantity 3112 of notifications in the notification prompt box 311.

In another example, it is assumed that a vehicle-mounted device is a public terminal of the target user. When the vehicle-mounted device receives a non-urgency notification for the target user from the server, if the vehicle-mounted device detects that a vehicle in which the vehicle-mounted device is located is currently in a driving state, the vehicle-mounted device may consider that the vehicle-mounted device is currently in the busy state. In this case, the vehicle-mounted device does not prompt the notification for the target user. When the vehicle-mounted device detects that the vehicle in which the vehicle-mounted device is located is changed from the driving state to a stop state, the vehicle-mounted device may consider that the vehicle-mounted device is currently changed from the busy state to the idle state. In this case, the vehicle-mounted device prompts the notification for the target user.

Further, if the notification for the target user relates to the privacy of the target user, and there is another unauthorized user in the vehicle in which the vehicle-mounted device is located, the vehicle-mounted device may prompt the notification for the target user in the second prompt mode. For example, the vehicle-mounted device may prompt the notification for the target user by using a notification prompt box. Specifically, the vehicle-mounted device may display a quantity of notifications in the notification prompt box. If the notification for the target user relates to the privacy of the target user, and there is no another unauthorized user in the vehicle in which the vehicle-mounted device is located, the vehicle-mounted device may prompt the notification for the target user in the first prompt mode. For example, the vehicle-mounted device may prompt the notification for the target user by using a notification prompt box. Specifically, the vehicle-mounted device may display a type of the notification, a source of the notification, and content of the notification in the notification prompt box.

In another possible implementation of this embodiment, the user may alternatively define a prompt occasion of a non-urgent notification as a moment at which a terminal device is in the idle state and a status of using the terminal device by the user is "in use". The status of using the terminal device by the user is used to describe whether the user is staring at the display of the terminal device. Specifically, the state of using the terminal device by the user may include "in use" and "not in use". When the status of using the terminal device by the user is "in use", it indicates that the user is currently staring at the display of the terminal device. When the status of using the terminal device by the user is "not in use", it indicates that the user does not stare at the display of the terminal device. Based on this, S3422 may specifically include the following step:

if the urgency attribute of the notification is non-urgent, when it is detected that the notification relates to the privacy of the target user, controlling, the public terminal to prompt the notification in the second prompt mode when the public terminal is in the idle state and a status of using the public terminal by the target user is "in use".

In this implementation, when detecting that the notification for the target user is a non-urgent notification, the server determines that the prompt occasion of the notification is a moment at which the terminal device is in the idle state and the status of using the terminal device by the user is "in use". After determining the prompt occasion of the notification for the target user, the server further detects whether the notification for the target user relates to the privacy of the target user. When detecting that the notification for the target user relates to the privacy of the target user, the server determines that the prompt mode of the notification on the terminal device is the second prompt mode. After determining the prompt occasion and the prompt mode of the notification for the target user, the server sends the notification for the target user and the prompt mode and the prompt occasion of the notification to the public terminal.

After receiving the notification for the target user from the server, the public terminal prompts the notification for the target user in the second prompt mode when the public terminal is in the idle state and the status of using the public terminal by the target user is "in use". The public terminal does not prompt the notification for the target user when the public terminal is in the busy state or the status of using the public terminal by the target user is "not in use".

Specifically, when receiving the notification for the target user from the server, the public terminal may detect a current working state of the public terminal, and detect a current status of using the public terminal by the target user. It should be noted that a manner in which the public terminal detects the working state of the public terminal is described in detail in the foregoing implementation. For details, refer to related descriptions in the foregoing implementation. Details are not described herein again. In actual application, by way of example, and not limitation, when detecting the status of using the public terminal by the target user, the public terminal may start a front-facing camera of the public terminal to obtain a facial image of the target user, and detect the status of using the public terminal by the target user by identifying an eye status of the target user in the facial image. Specifically, when detecting, based on the eye status of the target user in the facial image, that the target user does not stare at the display of the public terminal, the public terminal determines that the status of using the public terminal by the target user is "not in use". When detecting, based on the eye status of the target user in the facial image, that the target user is staring at the display of the public terminal, the public terminal determines that the status of using the public terminal by the target user is "in use".

More specifically, if the public terminal detects that the public terminal is currently in the idle state, and the status of using the public terminal by the target user is "in use", the public terminal immediately prompts the notification for the target user in the second prompt mode. If the public terminal detects that the public terminal is currently in the busy state, and the status of using the public terminal by the target user is "in use", the public terminal prompts the notification for the target user in the second prompt mode after the public terminal is changed from the busy state to the idle state. If the public terminal detects that the public terminal is currently in the idle state, but the status of using the public terminal by the target user is "not in use", the public terminal prompts the notification for the target user in the second prompt mode when the status of using the public terminal by the target user is changed from "not in use" to "in use".

For example, refer to FIG. 20(a) to FIG. 20(c). An account of the user Jack is logged in on the television 31 of the user Jack. As shown in FIG. 20(a), it is assumed that when the server receives a non-urgent notification for the user Jack and sends the urgent notification to the television 31 of the user Jack, the user Jack and the user Tony are selecting, by using the television 31, a television program that the user Jack and the user Tony want to watch. A display interface of the television 31 displays a main menu interface in this case, and the user Jack and the user Tony are staring at a display of the television 31. That is, the television 31 is in the idle state and a status of using the television 31 by the user Jack is "in use" in this case. Therefore, the television 31 may prompt the notification for the user Jack in the second prompt mode in this case. For example, the television 31 may prompt the notification for the user Jack by using a notification prompt box 311. Specifically, the television 31 may display a target user 3111 for which the notification is intended and a quantity 311 of notifications in the notification prompt box 311.

As shown in FIG. 20(b), it is assumed that when the server receives a non-urgent notification for the user Jack and sends the urgent notification to the television 31 of the user Jack, a display interface of the television 31 displays a main menu interface, but the user Jack in front of the television 31 does not stare at the display of the television 31. That is, although the television 31 is in the idle state, the status of using the television 31 by the user Jack is "not in use" in this case. Therefore, the television 31 does not prompt the notification for the user Jack in this case. As shown in FIG. 20(a), the television 31 prompts the notification for the user Jack only when the user Jack stares at the display of the television 31 again.

As shown in FIG. 20(c), it is assumed that when the server receives a non-urgent notification for the user Jack and sends the urgent notification to the television 31 of the user Jack, a display interface of the television 31 displays a main menu interface, but the user Jack in front of the television 31 just leaves (does not stare at the display of the television 31). That is, although the television 31 is in the idle state, the status of using the television 31 by the user Jack is "not in use" in this case. Therefore, the television 31 does not prompt the notification for the user Jack in this case. As shown in FIG. 20(a), the television 31 prompts the notification for the user Jack only when the user Jack returns to the front of the television 31 and stares at the display of the television 31.

In still another possible implementation of this embodiment, when detecting that the public terminal is currently in the idle state but the status of using the public terminal by the target user is "not in use", the public terminal may alternatively prompt the notification for the target user in a notification prompt mode combining the second prompt mode and a ringtone mode and/or a voice broadcast mode. Specifically, when there a plurality of users are currently using the public terminal, when prompting the target user in a voice broadcast manner, the public terminal may broadcast only the target user for which the notification is intended and a quantity of received notifications, but does not broadcast specific content of the notification.

Figure 21:
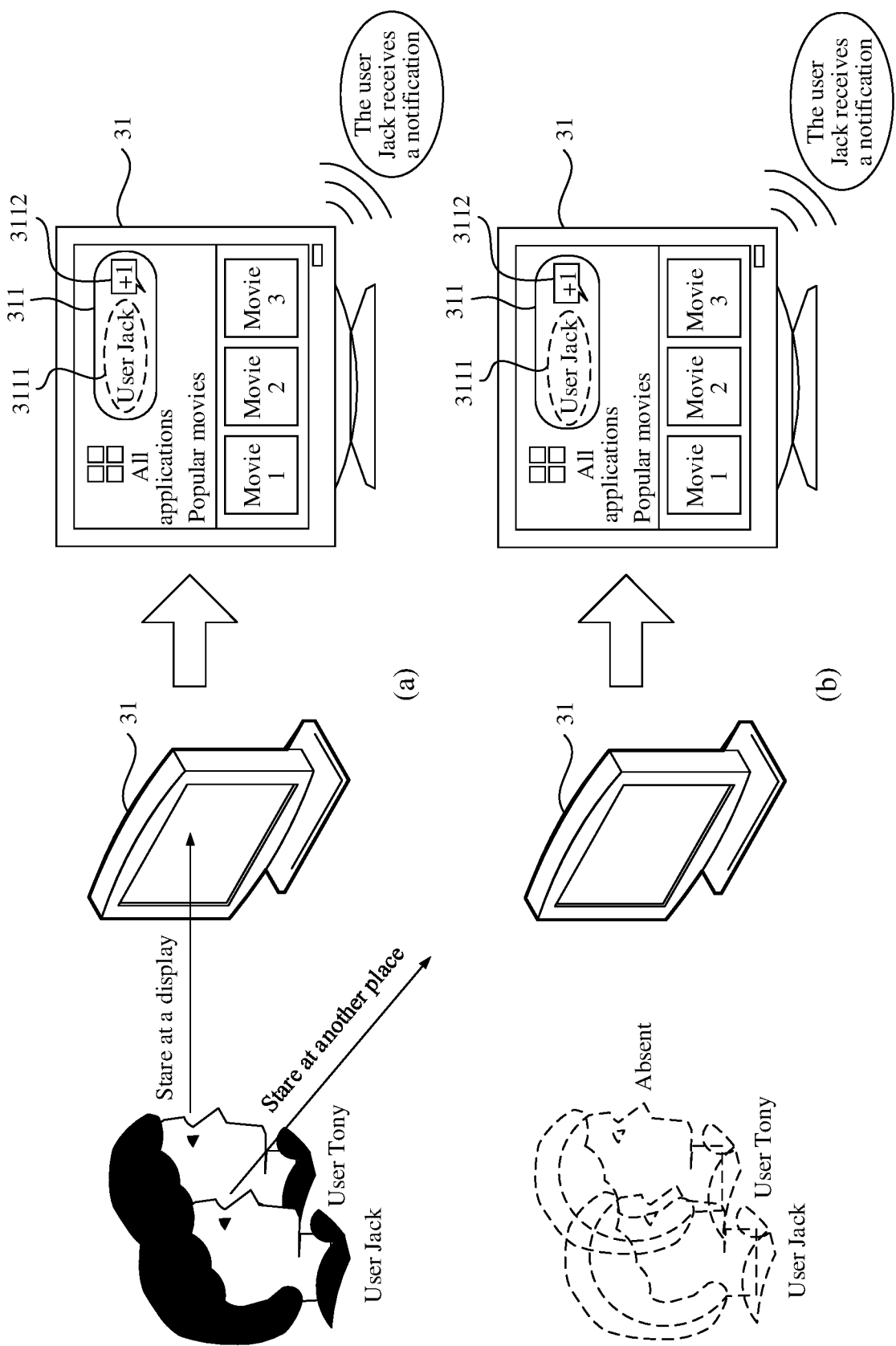
FIG. 21 is a schematic diagram of a specific scenario to which a notification prompt method is applicable according to another embodiment of this application.

For example, refer to FIG. 21. It is assumed that when the server receives a non-urgent notification for the user Jack and sends the urgent notification to the television 31 of the user Jack, a display interface of the television 31 displays a main menu interface, but the user Jack does not stare at a display of the television 31 (for example, in (a) in FIG. 21, the user Jack is in front of the television 31 but does not stare at the display of the television 31, or in (b) in FIG. 21, the user Jack is not in front of the television 31 in this case). That is, although the television 31 is in the idle state, a status of using the television 31 by the user Jack is "not in use" in this case. Therefore, the television 31 may prompt the notification for the user Jack in a notification prompt mode combining the second prompt mode with the ringtone mode and/or the voice broadcast mode in this case. For example, the television 31 may prompt the notification for the user Jack by using a notification prompt box 311. Specifically, the television 31 may display, in the notification prompt box 311, a target user 3111 for which the notification is intended and a quantity 311 of notifications. In addition, the television 21 may further prompt the target user in the voice broadcast mode. When the television 21 performs voice broadcast, only the target user for which the notification is intended and the quantity of received notifications can be broadcasted.

In still another embodiment of this application, after S3422, the notification prompt method may further include the following step:

determining the prompt occasion of the notification based on the urgency attribute of the notification, and when it is detected that the notification does not relate to the privacy of the target user, controlling the public terminal to prompt the notification in the first prompt mode when the prompt occasion arrives.

In this embodiment, after determining the prompt occasion of the notification for the target user, when detecting that the notification does not relate to the privacy of the target user, the server may control the public terminal to prompt the notification for the target user in the first prompt mode when the prompt occasion of the notification arrives. Because the notification for the target user does not relate to the privacy of the target user, personal privacy of the target user is not leaked when the public terminal displays the notification in the first prompt mode.

In still another embodiment of this application, after S3422, the notification prompt method may further include the following step:

determining the prompt occasion of the notification based on the urgency attribute of the notification, and when it is detected that the notification relates to the privacy of the target user and the plurality of users currently using the public terminal are all preset authorized users, controlling the public terminal to prompt the notification in the first prompt mode when the prompt occasion arrives.

In this embodiment, when determining the prompt occasion of the notification for the target user and detecting that the notification for the target user relates to the privacy of the target user, the server further detects, based on identity information of each user currently using the public terminal, whether a user other than the target user is a preset authorized user. In a possible implementation of this embodiment, the preset authorized user may be a user in an association relationship with the target user. It should be noted that a user in an association relationship with the target user has been described in detail in the foregoing embodiment. For details, refer to related descriptions in the foregoing embodiment. Details are not described herein again.

When detecting that the plurality of users currently using the public terminal are all preset authorized users, the server determines that the prompt mode of the notification for the target user is the first prompt mode. After determining that the prompt mode of the notification for the target user is the first prompt mode, the server may send the notification for the target user received by the server, the prompt mode that is of the notification for the target user and that is determined by the server, and the prompt occasion for the notification on the terminal device to the public terminal at the same time. After receiving the foregoing information sent by the server, the public terminal prompts the notification for the target user in the first prompt mode.

Figure 22:
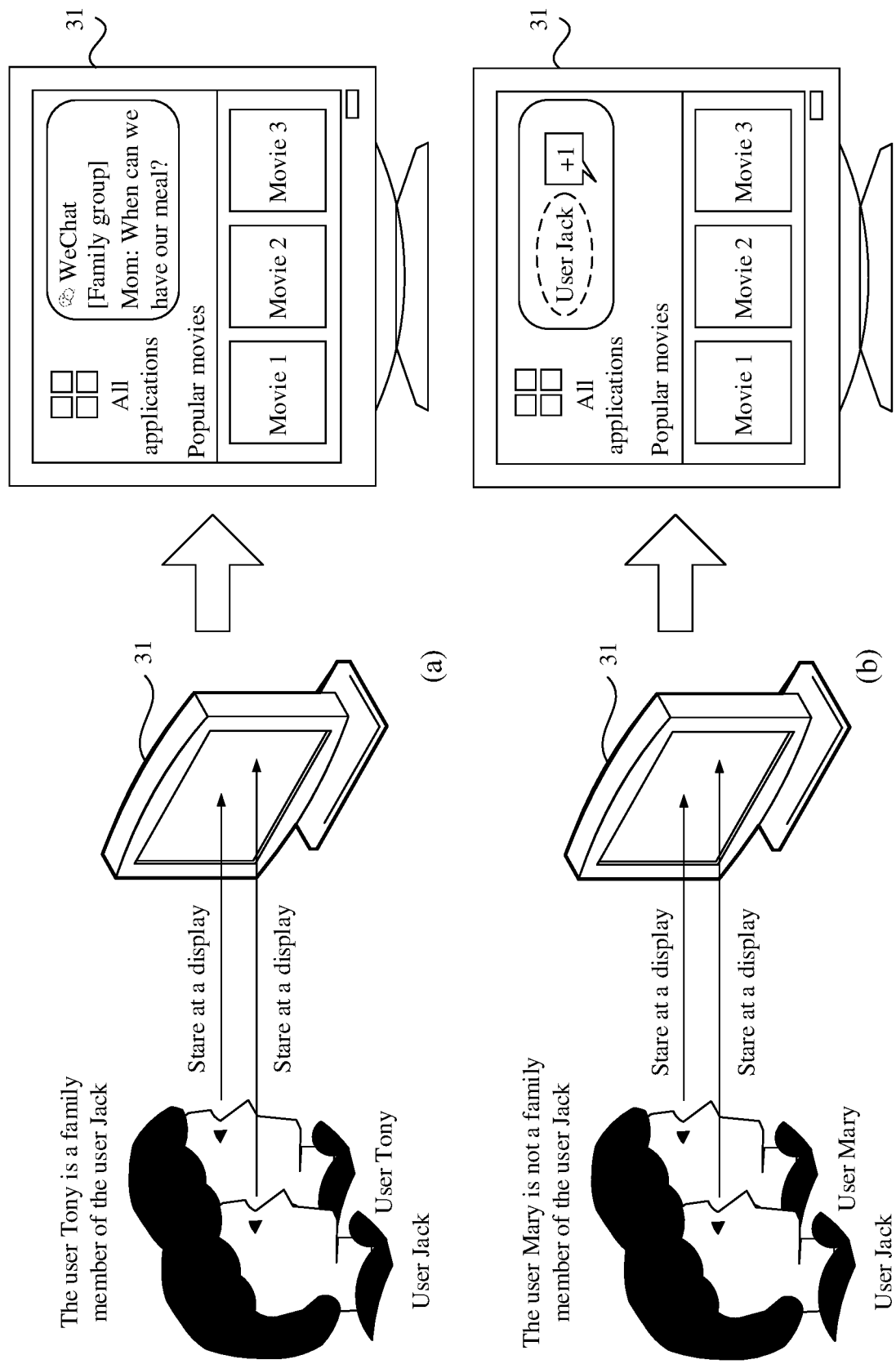
FIG. 22 is a schematic diagram of a specific scenario to which a notification prompt method is applicable according to another embodiment of this application.

For example, refer to FIG. 22. It is assumed that the television 31 is a public terminal of the target user Jack. When the television 31 receives a WeChat notification for the user Jack from the server, and the WeChat notification is from a family group including both the user Jack and the user Tony, as shown in (a) in FIG. 22, it is assumed that the user Jack and the family member Tony are watching the television 31. Because the user Tony and the user Jack are in the same family group, that is, the user Tony is a preset authorized user, the television 31 may prompt the notification for the user Jack in the first prompt mode. As shown in (b) in FIG. 22, it is assumed that the user Jack and a friend Mary are watching the television 31 in this case. Because Mary is not a family member of the user Tony, that is, Mary is an unauthorized user, the television 31 may prompt the notification for the user Jack in the second prompt mode.

In still another embodiment of this application, after S342, the notification prompt method may further include the following step:

if it is detected that a new terminal device in the terminal devices on which the account of the target user is logged in currently meets the preset notification prompt condition, the new terminal device includes a private terminal of the target user, and a user currently using the private terminal is the target user, controlling the public terminal to cancel the prompt of the notification, and controlling the private terminal to prompt the notification in the first prompt mode.

In this embodiment, after controlling the only public terminal included in the target terminal to prompt the notification for the target user, the server may further detect in real time whether a new terminal device meets the preset notification prompt condition in the terminal devices on which the account of the target user is logged in. The new terminal device may be any terminal device other than the target terminal in the terminal devices on which the account of the target user is logged in.

For example, it is assumed that terminal devices on which the account of the target user Jack is logged in include a mobile phone, a tablet computer, and a television of the user Jack, the mobile phone is a private terminal of the user Jack, and the tablet computer and the computer are public terminals of the user Jack. If the target terminal that meets the preset notification prompt condition and that is determined by the server in S31 includes only the television of the user Jack, the new terminal device that meets the preset notification prompt condition and that is detected by the server in this embodiment may include the mobile phone and/or the tablet computer of the user Jack.

The server further detects a device type of the new terminal device when detecting that the new terminal device meets the preset notification prompt condition in the terminal devices on which the account of the target user is logged in. When detecting that the new terminal device includes a private terminal of the target user, the server obtains identity information of a user currently using the private terminal, and detects, based on the identity information of the user currently using the private terminal, a quantity and identities of users currently using the private terminal. It should be noted that, in this embodiment, a manner in which the server obtains the identity information of the user currently using the private terminal may be the same as the manner in which the server obtains the identity information of the user in S32. For details, refer to related descriptions in S32. Details are not described herein again.

In a possible implementation of this embodiment, when detecting that the user currently using the private terminal includes only the target user, the server may send a notification hiding instruction to the only public terminal included in the target terminal determined by the server in S31. The notification hiding instruction is used to instruct the public terminal to cancel the prompt of the notification for the target user. At the same time, the server further sends the notification for the target user and a prompt mode of the notification to the private terminal determined by the server in this embodiment, to control the private terminal to prompt the notification for the target user in the first prompt mode. In another possible implementation of this embodiment, when detecting that the user currently using the private terminal is not the target user, the server controls the only public terminal included in the target terminal determined by the server in S31 to continue prompting the notification for the target user.

Figure 23A:
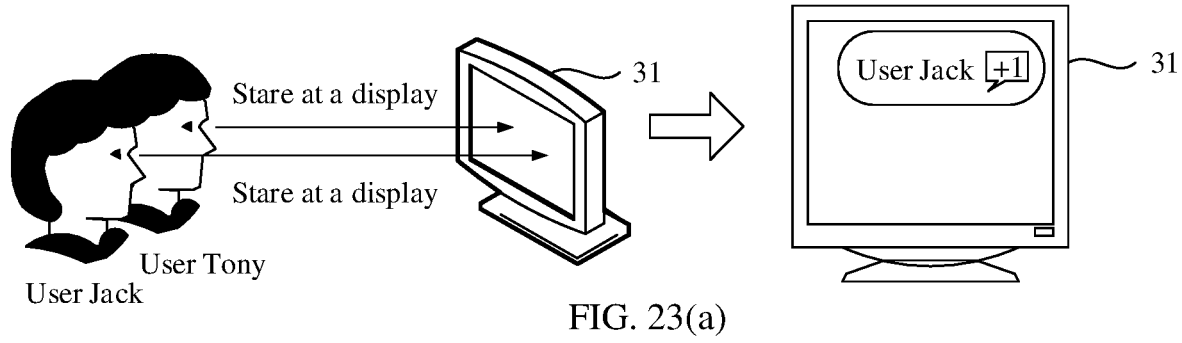
FIG. 23(*a*) to FIG. 23(*c*) are a schematic diagram of a specific scenario to which a notification prompt method is applicable according to another embodiment of this application.
Figure 23B:
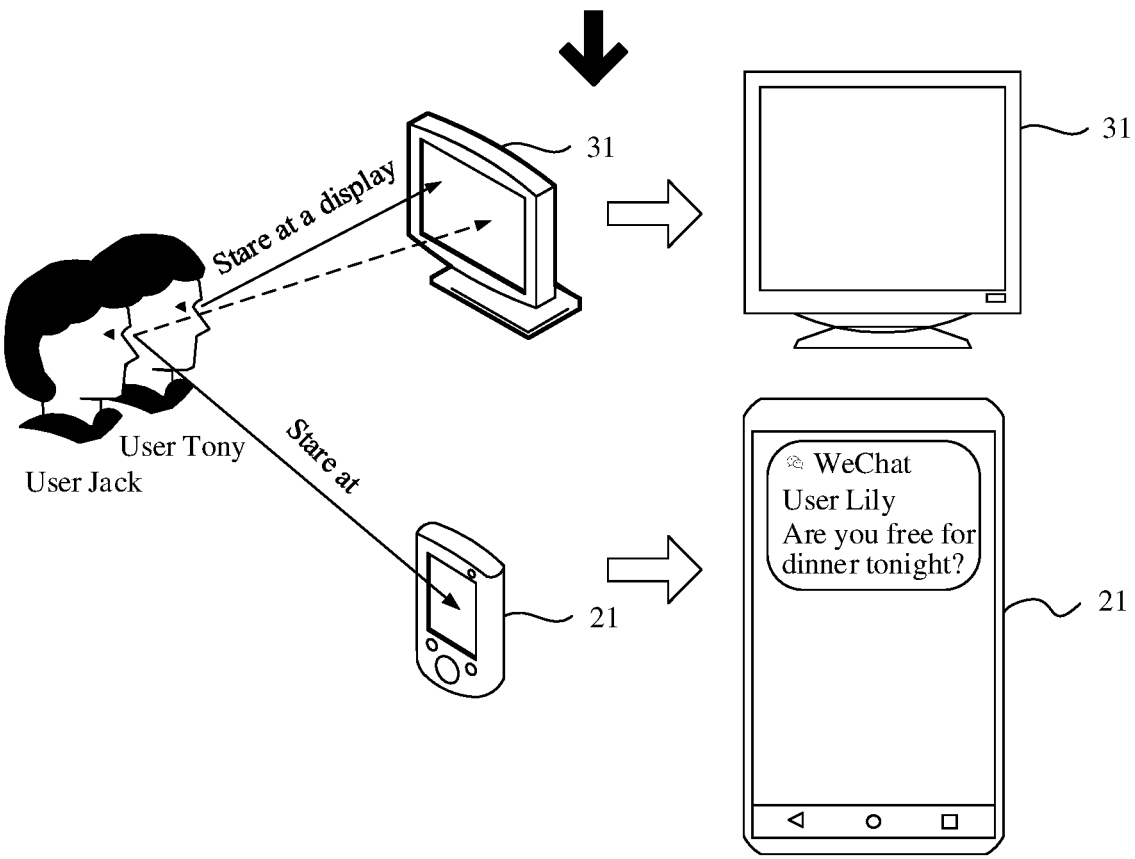
Figure 23C:
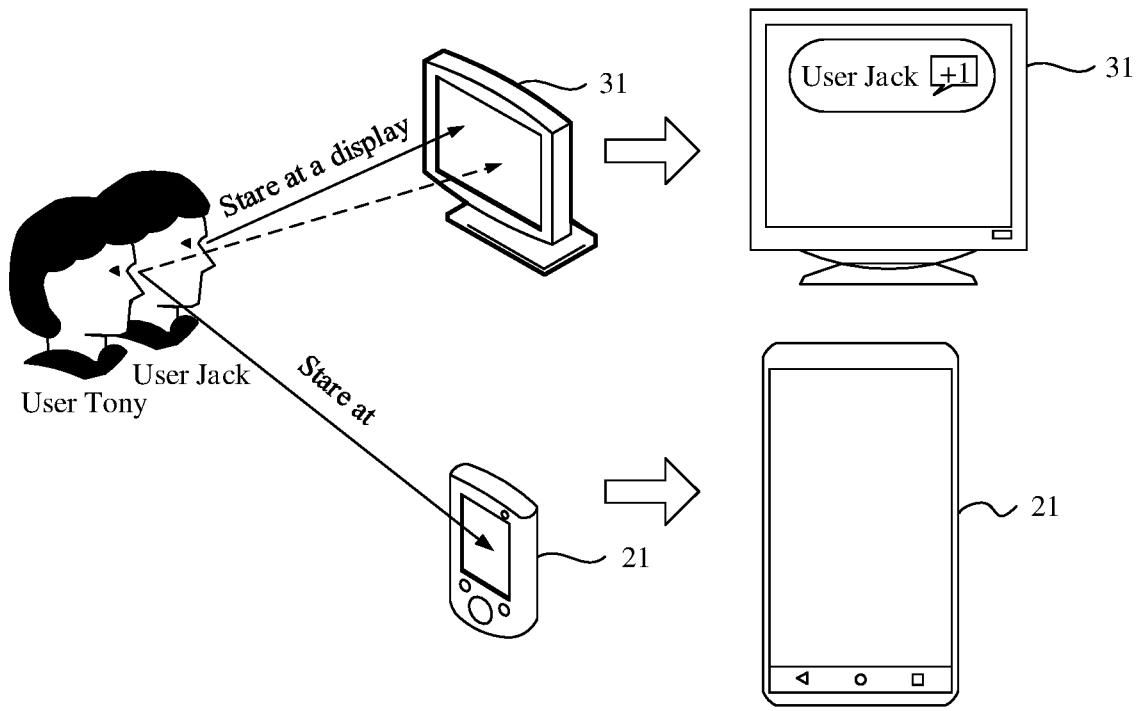

For example, refer to FIG. 23(a) to FIG. 23(c). In FIG. 23(a), if the server detects, when receiving the notification for the target user Jack, that the target terminal includes only the television 31 of the user Jack, and the user Jack and the user Tony are currently using the television 31, the server controls the television 31 of the user Jack to prompt the notification for the user Jack in the second prompt mode. In FIG. 23(b), if the server controls the television 31 to prompt the notification for the user Jack, and then detects that the mobile phone 21 on which the account of the user Jack is logged in is currently used by the user Jack, for example, is currently picked up by the user Jack, the server controls the television 31 of the user Jack to cancel the prompt of the notification for the user Jack, and controls the mobile phone 21 of the user Jack to prompt the notification for the user Jack in the first prompt mode. In FIG. 23(b), if the server controls the television 31 to prompt the notification for the user Jack, and then detects that the mobile phone 21 on which the account of the user Jack is logged in is currently used by the user Tony, for example, is currently picked up by the user Tony, the server continues controlling the television 31 of the user Jack to prompt the notification for the user Jack.

It may be understood that sequence numbers of the processes do not mean execution sequences in the foregoing embodiments. The execution sequences of the processes should be determined according to functions and internal logic of the processes, and should not be construed as any limitation on the implementation processes of embodiments of this application.

Figure 24:
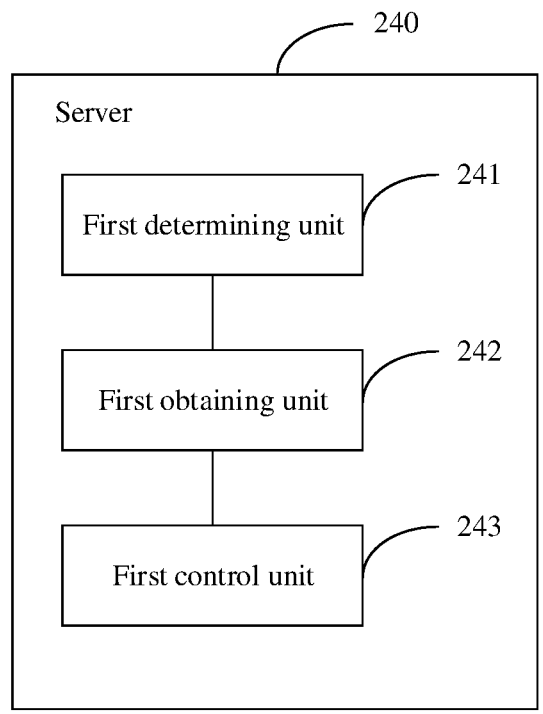
FIG. 24 is a block diagram of a structure of a server according to an embodiment of this application.

Corresponding to the notification prompt method in the foregoing embodiments, FIG. 24 is a block diagram of a structure of a server according to an embodiment of this application. The server may be specifically an application server, an operator server, or a device manufacturer server. Units included in the server are configured to perform the steps in the foregoing embodiments. For details, refer to related descriptions in the foregoing embodiments. For ease of description, only a part related to embodiments of this application is shown. Refer to FIG. 24. A server 240 includes a first determining unit 241, a first obtaining unit 242, and a first control unit 243.

The first determining unit 241 is configured to: when a notification for a target user is received, determine a target terminal that meets a preset notification prompt condition from terminal devices on which an account of the target user is logged in.

The first obtaining unit 242 is configured to obtain identity information of a user currently using the target terminal.

The first control unit 243 is configured to: if it is detected, based on the identity information, that only the target user is currently using the target terminal, control the target terminal to prompt the notification in a first prompt mode, where preview content of the notification is displayed in the first prompt mode.

The first control unit 243 is alternatively configured to: if it is detected, based on the identity information, that a plurality of users are currently using the target terminal, control the target terminal to prompt the notification in a second prompt mode, where preview content of the notification is not displayed in the second prompt mode.

Further, the first control unit 243 is specifically configured to: if it is detected, based on the identity information, that only the target user is currently using the target terminal, and it is detected that the target terminal includes the private terminal of the target user, control the private terminal to prompt the notification in the first prompt mode.

Further, the first control unit 243 includes a first urgency attribute determining unit and a first terminal control unit.

The first urgency attribute determining unit is configured to: if it is detected, based on the identity information, that only the target user is currently using the target terminal, and it is detected that the target terminal includes only the public terminal, determine an urgency attribute of the notification.

The first terminal control unit is configured to determine a prompt occasion of the notification based on the urgency attribute of the notification, and control the public terminal to prompt the notification in the first prompt mode when the prompt occasion arrives.

Further, the first terminal control unit includes a second control unit and a third control unit.

The second control unit is configured to: if the urgency attribute of the notification is urgent, control the public terminal to prompt the notification in the first prompt mode when the notification is received.

The third control unit is configured to: if the urgency attribute of the notification is non-urgent, control the public terminal to prompt the notification in the first prompt mode when the public terminal is in an idle state.

Further, the third control unit is specifically configured to:
if the urgency attribute of the notification is non-urgent, control the public terminal to prompt the notification in the first prompt mode when the public terminal is in the idle state and a status of using the public terminal by the target user is "in use".

Further, the server further includes a fourth control unit.

The fourth control unit is configured to: if it is detected that a new terminal device in the terminal devices on which the account of the target user is logged in currently meets the preset notification prompt condition, the new terminal device includes a private terminal of the target user, and a user currently using the private terminal is the target user, control the public terminal to cancel the prompt of the notification, and control the private terminal to prompt the notification in the first prompt mode.

Further, the first control unit 243 is specifically configured to:
if it is detected, based on the identity information, that the plurality of users are currently using the target terminal, and it is detected that the target terminal includes a private terminal of the target user, when a plurality of users are currently using the private terminal, and the notification relates to privacy of the target user, control the private terminal to prompt the notification in the second prompt mode.

Further, the first control unit 243 is specifically configured to:
if it is detected, based on the identity information, that the plurality of users are currently using the target terminal, and it is detected that the target terminal includes a private terminal of the target user, when a plurality of users currently using the private terminal include the target user, and the notification does not relate to privacy of the target user, control the private terminal to prompt the notification in the first prompt mode.

Further, the server further includes a fifth control unit.

The fifth control unit is configured to: if it is detected, based on the identity information, that the plurality of users are currently using the target terminal, and it is detected that the target terminal includes a private terminal of the target user, when a user currently using the private terminal includes only the target user, control the private terminal to prompt the notification in the first prompt mode.

Further, the first control unit 243 specifically includes a second urgency attribute determining unit and a second terminal control unit.

The second urgency attribute determining unit is configured to: if it is detected, based on the identity information, that the plurality of users currently using the target terminal include the target user, and it is detected that the target terminal includes only a public terminal, determine an urgency attribute of the notification.

The second terminal control unit is configured to determine a prompt occasion of the notification based on the urgency attribute of the notification, and when it is detected that the notification relates to privacy of the target user, control the public terminal to prompt the notification in the second prompt mode when the prompt occasion arrives.

Further, the second terminal control unit specifically includes a sixth control unit and a seventh control unit.

The sixth control unit is configured to: if the urgency attribute of the notification is urgent, when it is detected that the notification relates to privacy of the target user, controlling the public terminal to prompt the notification in the second prompt mode when the notification is received.

The seventh control unit is configured to: if the urgency attribute of the notification is non-urgent, when it is detected that the notification relates to the privacy of the target user, control the public terminal to prompt the notification in the second prompt mode when the public terminal is in an idle state.

Further, the seventh control unit is specifically configured to: if the urgency attribute of the notification is non-urgent, when it is detected that the notification relates to the privacy of the target user, control, the public terminal to prompt the notification in the second prompt mode when the public terminal is in the idle state and a status of using the public terminal by the target user is "in use".

Further, the server further includes an eighth control unit.

The eighth control unit is configured to determine the prompt occasion of the notification based on the urgency attribute of the notification, and when it is detected that the notification does not relate to the privacy of the target user, control the public terminal to prompt the notification in the first prompt mode when the prompt occasion arrives.

Further, the server further includes a ninth control unit.

The ninth control unit is configured to determine the prompt occasion of the notification based on the urgency attribute of the notification, and when it is detected that the notification relates to the privacy of the target user and the plurality of users currently using the public terminal are all preset authorized users, control the public terminal to prompt the notification in the first prompt mode when the prompt occasion arrives.

Further, the server further includes a tenth control unit.

The tenth control unit is configured to: if it is detected that a new terminal device in the terminal devices on which the account of the target user is logged in currently meets the preset notification prompt condition, the new terminal device includes a private terminal of the target user, and a user currently using the private terminal is the target user, control the public terminal to cancel the prompt of the notification, and control the private terminal to prompt the notification in the first prompt mode.

It can be learned from the foregoing that, when receiving the notification for the target user, the server provided in this embodiment of this application first determines the target terminal that meets the preset notification prompt condition from the terminal devices on which the account of the target user is logged in, and then detects, based on the identity information of the user currently using the target terminal, a quantity and identities of users currently using the target terminal. When detecting that only the target user is currently using the target terminal, the server controls the target terminal to prompt the notification for the target user in a prompt mode of displaying preview content of the notification. When detecting that a plurality of users are currently using the target terminal, the server controls the target terminal to prompt the notification for the target user in a prompt mode in which preview content of the notification is not displayed. That is, the server can intelligently adjust a notification prompt mode of the target terminal based on the quantity and identities of the users currently using the target terminal. Compared with the conventional technology, according to the notification prompt method provided in embodiments of this application, a user does not need to set a notification prompt mode on a terminal device, and intelligence of user privacy protection can be improved while user privacy is protected.

Figure 25:
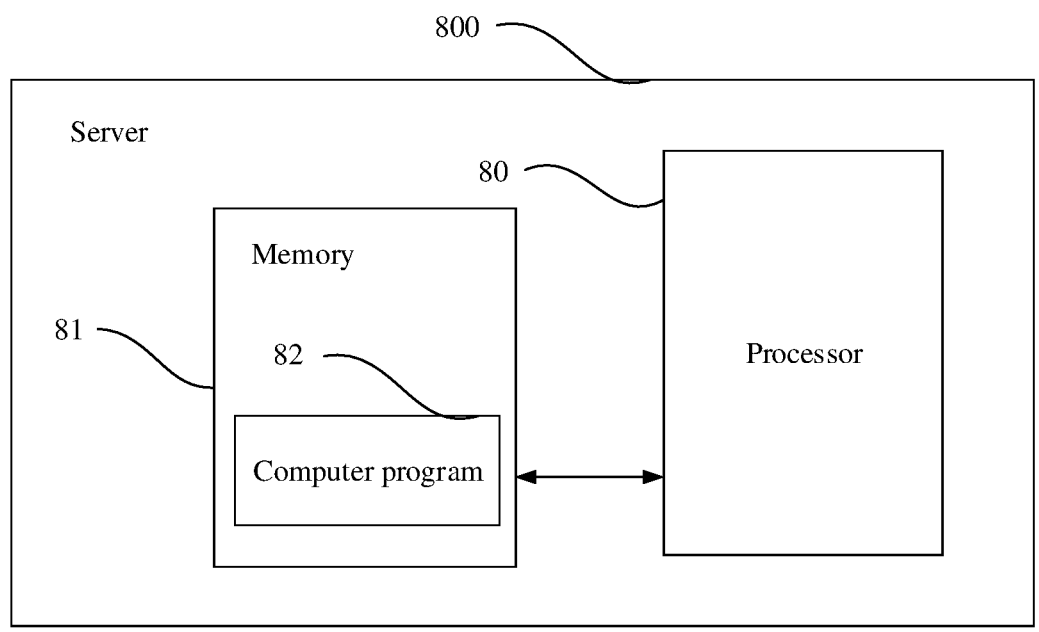
FIG. 25 is a schematic diagram of a structure of a server according to another embodiment of this application.

FIG. 25 is a schematic diagram of a structure of a server according to another embodiment of this application. As shown in FIG. 25, the server 800 in this embodiment includes at least one processor 80 (only one processor is shown in FIG. 25), a memory 81, and a computer program 82 that is stored in the memory 81 and that can be run on the at least one processor 80. When the processor 80 executes the computer program 82, the steps in any one of the foregoing embodiments of the notification prompt method are implemented.

The server 800 may be a computing device such as a desktop computer, a notebook computer, a palmtop computer, or a cloud server. The server may include but is not limited to the processor 80 and the memory 81. A person skilled in the art can understand that FIG. 25 is merely an example of the server 800, and does not constitute a limitation on the server 800. The server 800 may include more or fewer components than those shown in the figure, or some components may be combined, or different components may be included. For example, the server 800 may further include an input/output device, and a network access device.

The processor 80 may be a central processing unit (CPU), the processor 80 may further be another general purpose processor, a digital signal processor (DSP), an application specific integrated circuit (ASIC), a field-programmable gate array (FPGA) or another programmable logical device, a discrete gate or transistor logic device, or a discrete hardware component. The general-purpose processor may be a microprocessor, or the processor may be any conventional processor or the like.

In some embodiments, the memory 81 may be an internal storage unit of the server 800, for example, a hard disk or a memory of the server 800. In some other embodiments, the memory 81 may be alternatively an external storage device of the server 800, for example, a plug-in hard disk, a smart media card (SMC), a secure digital (SD) card, or a flash card that is disposed on the server 800. Further, the memory 81 may alternatively include both an internal storage unit of the server 800 and an external storage device. The memory 81 is configured to store an operating system, an application program, a boot loader, data, other programs, and the like, for example, program code of the computer program. The memory 81 may be further configured to temporarily store data that has been output or is to be output.

It should be noted that content such as information exchange between the foregoing apparatuses/units and the execution processes thereof is based on a same concept as the method embodiments of this application. For specific functions and technical effects of the content, refer to the method embodiments. Details are not described herein again.

It may be clearly understood by persons skilled in the art that, for the purpose of convenient and brief description, division into the foregoing function units and modules is used as an example for illustration. In actual application, the foregoing functions can be allocated to different function units and modules for implementation based on a requirement, that is, an inner structure of the apparatus is divided into different function units or modules to implement all or some of the functions described above. Function units and modules in embodiments may be integrated into one processing unit, or each of the units may exist alone physically, or two or more units may be integrated into one unit. The integrated unit may be implemented in a form of hardware, or may be implemented in a form of a software function unit. In addition, specific names of the function units and modules are merely for ease of distinguishing between the function units and modules, but are not intended to limit the protection scope of this application. For a specific working process of the units and modules in the foregoing system, refer to a corresponding process in the foregoing method embodiments. Details are not repeatedly described herein.

Embodiments of this application further provide a computer-readable storage medium. The computer-readable storage medium stores a computer program. When the computer program is executed by a processor, the steps in the foregoing notification prompt method may be implemented.

Embodiments of this application provide a computer program product. When the computer program product runs on a mobile terminal, the mobile terminal is enabled to implement the steps in the foregoing notification prompt method when executing the computer program product.

When the integrated unit is implemented in the form of a software function unit and sold or used as an independent product, the integrated unit may be stored in a computer-readable storage medium. Based on such an understanding, all or some of the processes of the method in embodiments of this application may be implemented by a computer program instructing related hardware. The computer program may be stored in a computer-readable storage medium. When the computer program is executed by the processor, steps of the foregoing method embodiments may be implemented. The computer program includes computer program code. The computer program code may be in a source code form, an object code form, an executable file form, some intermediate forms, or the like. The computer-readable medium may include at least any entity or apparatus that can carry the computer program code to a server, a recording medium, a computer memory, a read-only memory (ROM), a random access memory (RAM), an electrical carrier signal, a telecommunication signal, and a software distribution medium, for example, a USB flash drive, a removable hard disk, a magnetic disk, or an optical disk. In some jurisdictions, the computer-readable medium cannot be the electrical carrier signal or the telecommunications signal according to legislation and patent practices.

In the foregoing embodiments, the description of each embodiment has respective focuses. For a part that is not described in detail or recorded in an embodiment, refer to related descriptions in other embodiments.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In embodiments provided in this application, it should be understood that the disclosed apparatus/network device and method may be implemented in other manners. For example, the described apparatus/network device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
when a notification for a target user is received, determining a target terminal that meets a preset notification prompt condition among terminal devices on which an account of the target user is logged in;
obtaining identity information of a user currently using the target terminal; and
when it is detected, based on the identity information, that only the target user is currently using the target terminal, controlling the target terminal to prompt the notification in a first prompt mode, wherein preview content of the notification is displayed in the first prompt mode, and wherein when it is detected, based on the identity information, that only the target user is currently using the target terminal, controlling the target terminal to prompt the notification in the first prompt mode comprises:
when it is detected, based on the identity information, that only the target user is currently using the target terminal, and it is detected that the target terminal comprises only a public terminal, determining an urgency attribute of the notification;
determining a prompt occasion of the notification based on the urgency attribute of the notification, and controlling the public terminal to prompt the notification in the first prompt mode when the prompt occasion arrives, wherein determining the prompt occasion of the notification based on the urgency attribute of the notification, and controlling the public terminal to prompt the notification in the first prompt mode when the prompt occasion arrives comprises:
  when the urgency attribute of the notification is non-urgent, controlling the public terminal to prompt the notification in the first prompt mode when the public terminal is in an idle state; and
  after controlling the public terminal to prompt the notification in the first prompt mode when the prompt occasion arrives, when it is detected that a new terminal device in the terminal devices on which the account of the target user is logged in currently meets the preset notification prompt condition, the new terminal device comprises a private terminal of the target user, and a user currently using the private terminal is the target user, controlling the public terminal to cancel the prompt of the notification on the public terminal, and controlling the private terminal to prompt the notification in the first prompt mode.

2. The method according to claim 1, wherein when it is detected, based on the identity information, that only the target user is currently using the target terminal, controlling the target terminal to prompt the notification in the first prompt mode further comprises:
  when it is detected, based on the identity information, that only the target user is currently using the target terminal, and it is detected that the target terminal comprises a private terminal of the target user, controlling the private terminal to prompt the notification in the first prompt mode.

3. The method according to claim 1, wherein determining the prompt occasion of the notification based on the urgency attribute of the notification, and controlling the public terminal to prompt the notification in the first prompt mode when the prompt occasion arrives further comprises:
  when the urgency attribute of the notification is urgent, controlling the public terminal to prompt the notification in the first prompt mode when the notification is received.

4. The method according to claim 1, wherein when the urgency attribute of the notification is non-urgent, controlling the public terminal to prompt the notification in the first prompt mode when the public terminal is in the idle state comprises:
  when the urgency attribute of the notification is non-urgent, controlling the public terminal to prompt the notification in the first prompt mode when the public terminal is in the idle state and a status of using the public terminal by the target user is an in use status.

5. The method according to claim 1, further comprising:
  when it is detected, based on the identity information, that a plurality of users are currently using the target terminal, and it is detected that the target terminal comprises a private terminal of the target user, when the plurality of users are currently using the private terminal, and the notification relates to privacy of the target user, controlling the private terminal to prompt the notification in a second prompt mode, wherein preview content of the notification is not displayed in the second prompt mode.

6. The method according to claim 1, wherein after obtaining the identity information of the user currently using the target terminal, the method further comprises:
  when it is detected, based on the identity information, that a plurality of users are currently using the target terminal, and it is detected that the target terminal comprises a private terminal of the target user, when the plurality of users currently using the private terminal comprise the target user, and the notification does not relate to privacy of the target user, controlling the private terminal to prompt the notification in the first prompt mode.

7. The method according to claim 1, wherein after obtaining the identity information of the user currently using the target terminal, the method further comprises:
  when it is detected, based on the identity information, that a plurality of users are currently using the target terminal, and it is detected that the target terminal comprises a private terminal of the target user, when a user currently using the private terminal comprises only the target user, controlling the private terminal to prompt the notification in the first prompt mode.

8. The method according to claim 1, further comprising:
  when it is detected, based on the identity information, that a plurality of users currently using the target terminal comprise the target user, and it is detected that the target terminal comprises only the public terminal, determining the urgency attribute of the notification, and determining the prompt occasion of the notification based on the urgency attribute of the notification, and when it is detected that the notification relates to privacy of the target user, controlling the public terminal to prompt the notification in a second prompt mode when the prompt occasion arrives, wherein preview content of the notification is not displayed in the second prompt mode.

9. The method according to claim 8, wherein when it is detected, based on the identity information, that the plurality of users currently using the target terminal comprise the target user, and it is detected that the target terminal comprises only the public terminal, determining the urgency attribute of the notification, determining the prompt occasion of the notification based on the urgency attribute of the notification, determining the prompt occasion of the notification based on the urgency attribute of the notification, and when it is detected that the notification relates to privacy of the target user, controlling the public terminal to prompt the notification in the second prompt mode when the prompt occasion arrives, comprises:
  when the urgency attribute of the notification is urgent, and when it is detected that the notification relates to the privacy of the target user, controlling the public terminal to prompt the notification in the second prompt mode when the notification is received; or
  when the urgency attribute of the notification is non-urgent, and when it is detected that the notification relates to the privacy of the target user, controlling the public terminal to prompt the notification in the second prompt mode when the public terminal is in an idle state.

10. The method according to claim 9, wherein controlling, when the urgency attribute of the notification is non-urgent and when it is detected that the notification relates to the privacy of the target user, the public terminal to prompt the notification in the second prompt mode when the public terminal is in the idle state comprises:
  when the urgency attribute of the notification is non-urgent, and when it is detected that the notification relates to the privacy of the target user, controlling the public terminal to prompt the notification in the second prompt mode when the public terminal is in the idle state and a status of using the public terminal by the target user is an in use status.

11. The method according to claim 8, further comprising:
when it is detected, based on the identity information, that the plurality of users currently using the target terminal comprise the target user, and it is detected that the target terminal comprises only the public terminal, and when it is detected that the notification does not relate to the privacy of the target user, controlling the public terminal to prompt the notification in the first prompt mode when the prompt occasion arrives.

12. The method according to claim 8, further comprising:
when it is detected, based on the identity information, that the plurality of users currently using the target terminal comprise the target user, and it is detected that the target terminal comprises only the public terminal, and when it is detected that the notification relates to the privacy of the target user and the plurality of users currently using the public terminal are all preset authorized users, controlling the public terminal to prompt the notification in the first prompt mode when the prompt occasion arrives.

13. A server, comprising a memory, a processor, and a computer program that is stored in the memory and that is executable by the processor, wherein when executing the computer program the processor is caused to perform:
when a notification for a target user is received, determining a target terminal that meets a preset notification prompt condition among terminal devices on which an account of the target user is logged in;
obtaining identity information of a user currently using the target terminal; and
when it is detected, based on the identity information, that only the target user is currently using the target terminal, controlling the target terminal to prompt the notification in a first prompt mode, wherein preview content of the notification is displayed in the first prompt mode, and wherein when it is detected, based on the identity information, that only the target user is currently using the target terminal, controlling the target terminal to prompt the notification in the first prompt mode comprises:
when it is detected, based on the identity information, that only the target user is currently using the target terminal, and it is detected that the target terminal comprises only a public terminal, determining an urgency attribute of the notification;
determining a prompt occasion of the notification based on the urgency attribute of the notification, and controlling the public terminal to prompt the notification in the first prompt mode when the prompt occasion arrives, wherein determining the prompt occasion of the notification based on the urgency attribute of the notification, and controlling the public terminal to prompt the notification in the first prompt mode when the prompt occasion arrives comprises:
when the urgency attribute of the notification is non-urgent, controlling the public terminal to prompt the notification in the first prompt mode when the public terminal is in an idle state; and
after controlling the public terminal to prompt the notification in the first prompt mode when the prompt occasion arrives, when it is detected that a new terminal device in the terminal devices on which the account of the target user is logged in currently meets the preset notification prompt condition, the new terminal device comprises a private terminal of the target user, and a user currently using the private terminal is the target user, controlling the public terminal to cancel the prompt of the notification on the public terminal, and controlling the private terminal to prompt the notification in the first prompt mode.

14. The server according to claim 13, wherein when executing the computer program the processor is further caused to perform:
controlling a private terminal to prompt the notification in the first prompt mode when it is detected, based on the identity information, that only the target user is currently using the target terminal, and it is detected that the target terminal comprises the private terminal of the target user.

15. The server according to claim 13, wherein when executing the computer program the processor is further caused to perform:
when it is detected, based on the identity information, that a plurality of users are currently using the target terminal, and it is detected that the target terminal comprises a private terminal of the target user, and when the plurality of users are currently using the private terminal, and the notification relates to privacy of the target user, controlling the private terminal to prompt the notification in a second prompt mode, wherein preview content of the notification is not displayed in the second prompt mode.

16. A non-transitory computer-readable storage medium, wherein the non-transitory computer-readable storage medium stores a computer program, and when the computer program is executed by a processor, the computer program causes the processor to perform:
when a notification for a target user is received, determining a target terminal that meets a preset notification prompt condition from terminal devices on which an account of the target user is logged in;
obtaining identity information of a user currently using the target terminal; and
when it is detected, based on the identity information, that only the target user is currently using the target terminal, controlling the target terminal to prompt the notification in a first prompt mode, wherein preview content of the notification is displayed in the first prompt mode, and wherein when it is detected, based on the identity information, that only the target user is currently using the target terminal, controlling the target terminal to prompt the notification in the first prompt mode comprises:
when it is detected, based on the identity information, that only the target user is currently using the target terminal, and it is detected that the target terminal comprises only a public terminal, determining an urgency attribute of the notification;
determining a prompt occasion of the notification based on the urgency attribute of the notification, and controlling the public terminal to prompt the notification in the first prompt mode when the prompt occasion arrives, wherein determining the prompt occasion of the notification based on the urgency attribute of the notification, and controlling the public terminal to prompt the notification in the first prompt mode when the prompt occasion arrives comprises:
when the urgency attribute of the notification is non-urgent, controlling the public terminal to prompt the notification in the first prompt mode when the public terminal is in an idle state; and after controlling the public terminal to prompt the notification in the first prompt mode when the prompt occasion arrives, when it is detected that a new terminal device in the terminal devices on which the account of the target user is logged in currently meets the preset notification prompt condition, the new terminal device comprises a private terminal of the target user, and a user currently using the private terminal is the target user, controlling the public terminal to cancel the prompt of the notification on the public terminal, and controlling the private terminal to prompt the notification in the first prompt mode.

17. The server according to claim 13, wherein when executing the computer program the processor is further caused to perform:

after controlling the public terminal to prompt the notification in the first prompt mode when the prompt occasion arrives, when it is detected that a new terminal device in the terminal devices on which the account of the target user is logged in currently meets the preset notification prompt condition, the new terminal device comprises a private terminal of the target user, and a user currently using the private terminal is the target user, controlling the public terminal to cancel the prompt of the notification on the public terminal, and controlling the private terminal to prompt the notification in the first prompt mode.

18. The non-transitory computer-readable storage medium according to claim 16, wherein when the computer program is executed by the processor, the computer program causes the processor to perform:

after controlling the public terminal to prompt the notification in the first prompt mode when the prompt occasion arrives, when it is detected that a new terminal device in the terminal devices on which the account of the target user is logged in currently meets the preset notification prompt condition, the new terminal device comprises a private terminal of the target user, and a user currently using the private terminal is the target user, controlling the public terminal to cancel the prompt of the notification on the public terminal, and controlling the private terminal to prompt the notification in the first prompt mode.

* * * * *